(12) United States Patent
Sethi et al.

(10) Patent No.: US 12,228,999 B2
(45) Date of Patent: Feb. 18, 2025

(54) METHOD AND SYSTEM FOR DYNAMIC ELASTICITY FOR A LOG RETENTION PERIOD IN A DISTRIBUTED OR STANDALONE ENVIRONMENT

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 30 days.

(21) Appl. No.: 18/349,262

(22) Filed: Jul. 10, 2023

(65) Prior Publication Data

US 2025/0021420 A1 Jan. 16, 2025

(51) Int. Cl.
*G06F 11/07* (2006.01)
(52) U.S. Cl.
CPC ...... *G06F 11/0787* (2013.01); *G06F 11/0781* (2013.01)
(58) Field of Classification Search
CPC .......................... G06F 11/0787; G06F 11/0781
See application file for complete search history.

(56) References Cited

U.S. PATENT DOCUMENTS

| | | | | |
|---|---|---|---|---|
| 8,161,011 B2* | 4/2012 | Bolik | ..................... | G06F 16/185 707/E17.01 |
| 2012/0290584 A1* | 11/2012 | De Bona | ................... | G06F 8/60 707/741 |
| 2013/0073532 A1* | 3/2013 | Bachar | ................ | G06F 16/2308 707/704 |
| 2018/0113773 A1* | 4/2018 | Krishnan | ................ | G06N 5/022 |
| 2022/0374292 A1* | 11/2022 | Jha | ........................... | G06F 9/542 |
| 2023/0229545 A1* | 7/2023 | Yadav | ................ | G06F 11/0787 714/57 |
| 2023/0305940 A1* | 9/2023 | Buddha | ................ | G06F 11/3476 |
| 2024/0037009 A1* | 2/2024 | Buddha | .................... | G06N 3/04 |

(Continued)

FOREIGN PATENT DOCUMENTS

WO    WO-2018212924 A1 *    11/2018    .......... G06F 11/3409

*Primary Examiner* — Chae M Ko
*Assistant Examiner* — Indranil Chowdhury
(74) *Attorney, Agent, or Firm* — Aly Z. Dossa; DELL PRODUCTS L.P.

(57) ABSTRACT

A method for managing log retention period of an application includes: inferring dependencies and connectivity among applications; generating an application chain (AC) based on the inferred dependencies and connectivity; analyzing distributed logs and AC to extract health parameters; deriving a failure score of the AC based on the health parameters and inferred dependencies; inferring a user access frequency (UAF) and remaining assigned storage space (RASS) for an application log (AL); analyzing the failure score, UAF, and RASS for the AL; making a first determination that the failure score is greater than a failure score; making a second determination that the AC comprises a high priority application (HPA); making a third determination that the RASS for the HPA's AL is less than a storage space limit; notifying an administrator to initiate obtaining of extra storage space; and extending the current AL retention period of the HPA's AL.

20 Claims, 8 Drawing Sheets

(56) References Cited

U.S. PATENT DOCUMENTS

| | | | |
|---|---|---|---|
| 2024/0176526 A1* | 5/2024 | Sethi | G06F 3/0647 |
| 2024/0291835 A1* | 8/2024 | Sethi | H04L 63/1425 |
| 2024/0305523 A1* | 9/2024 | Sethi | H04L 41/0806 |

* cited by examiner

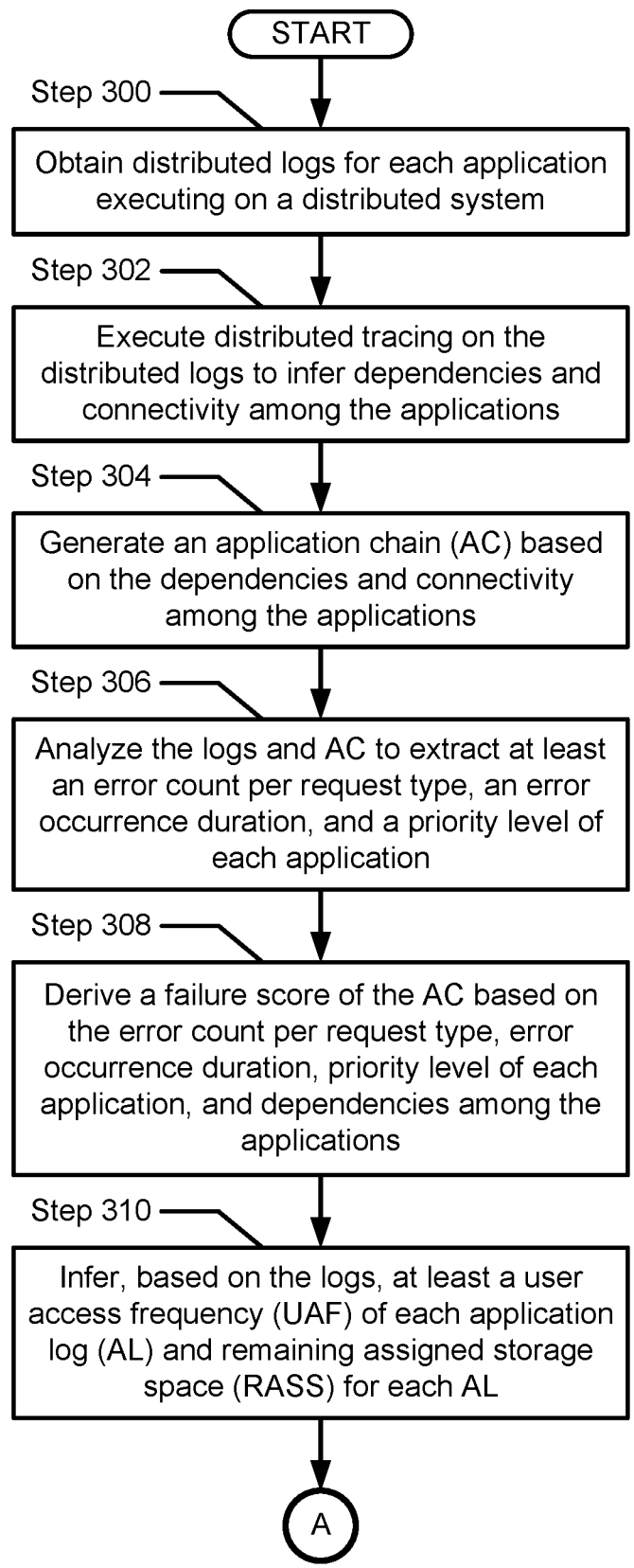
FIG. 3.1

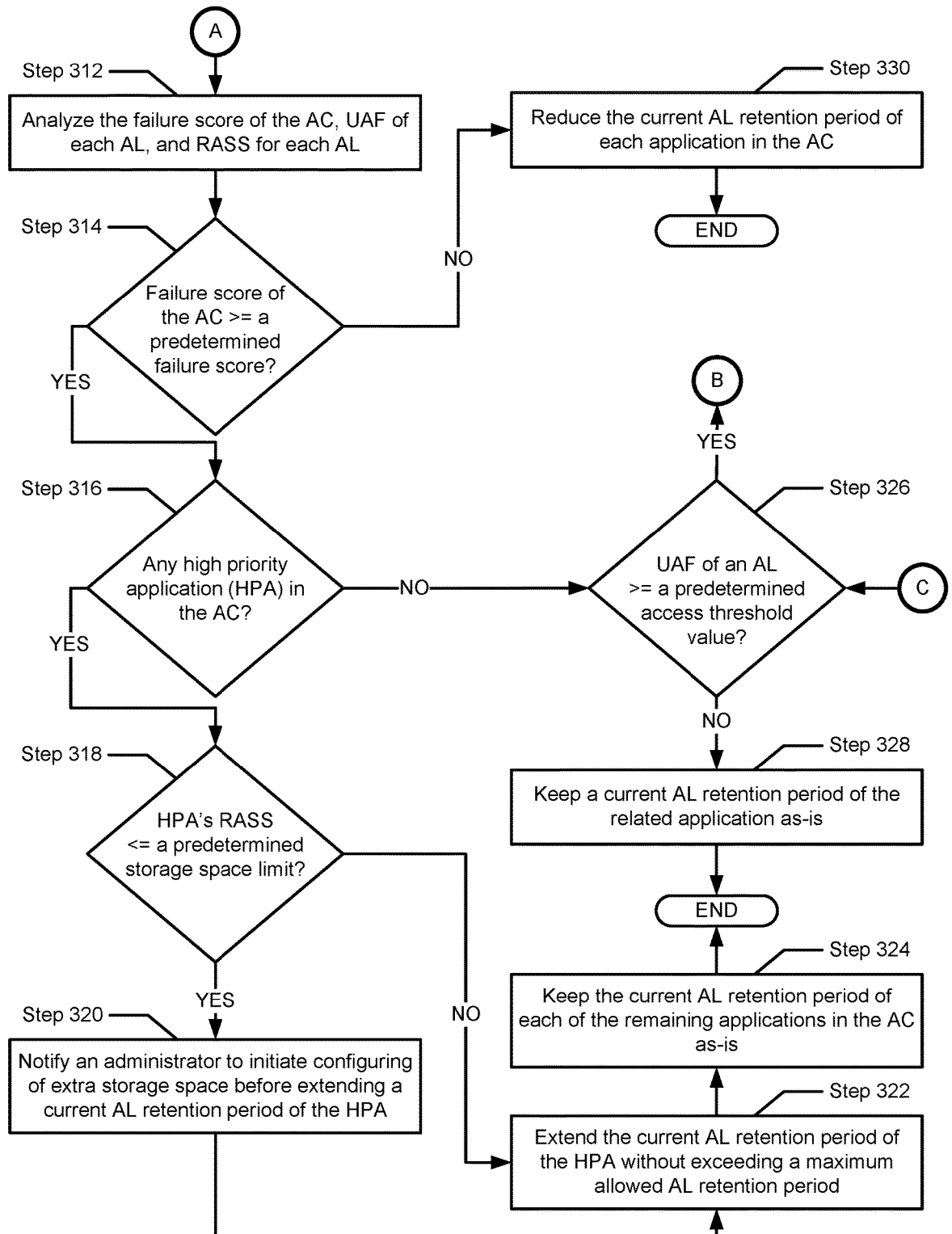
FIG. 3.2

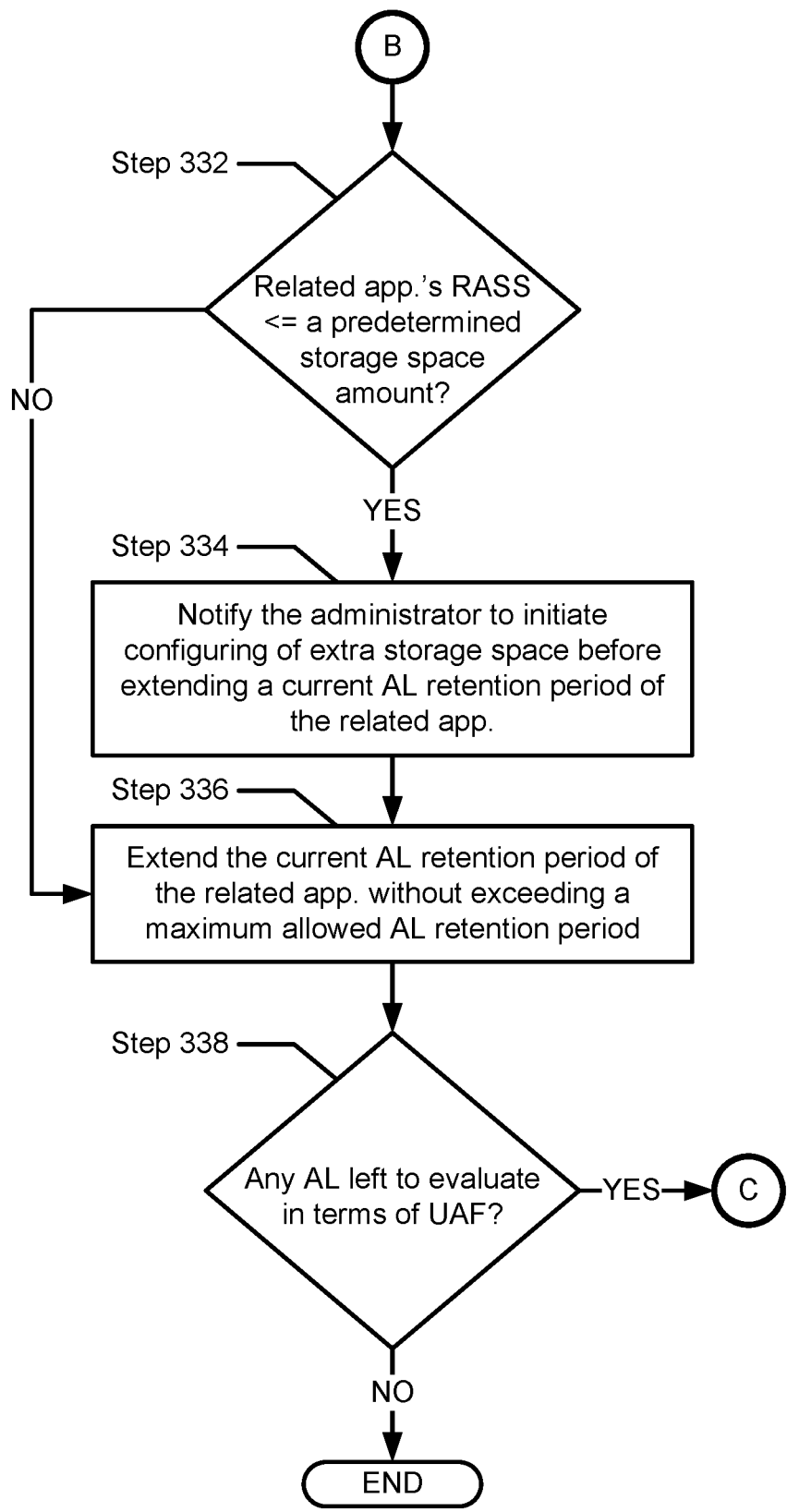
FIG. 3.3

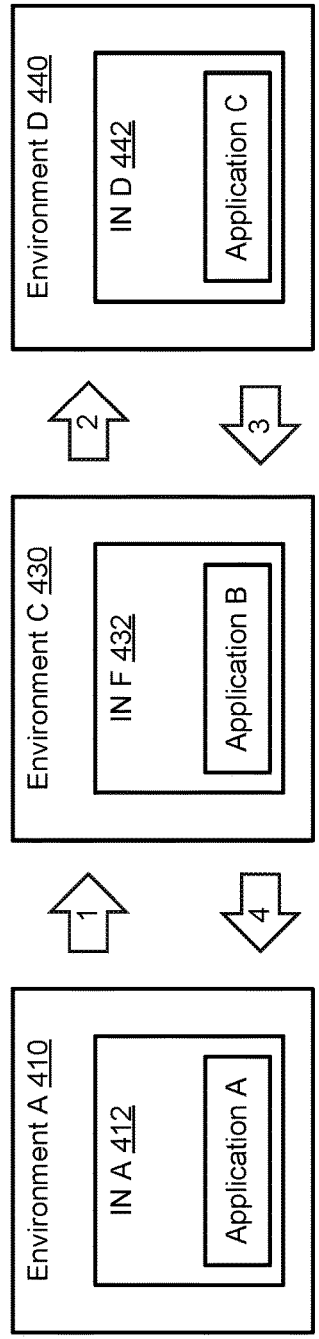
FIG 4.1

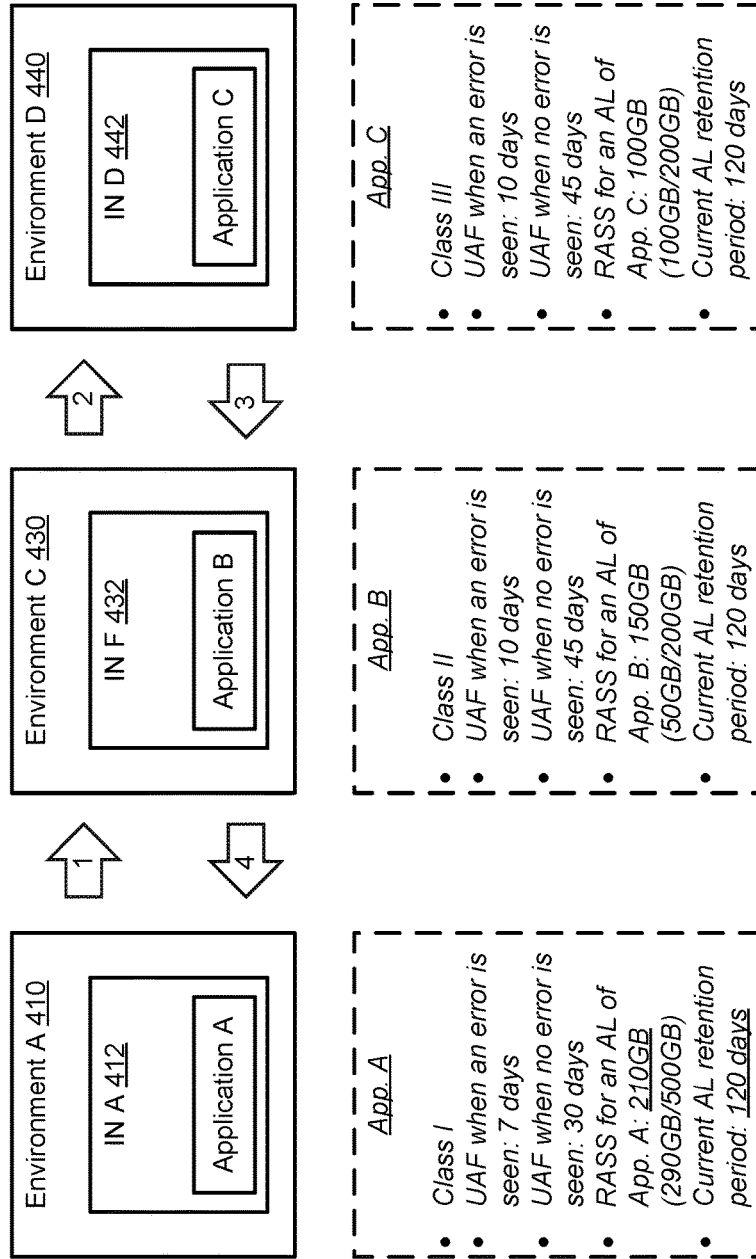
FIG 4.2

METHOD AND SYSTEM FOR DYNAMIC ELASTICITY FOR A LOG RETENTION PERIOD IN A DISTRIBUTED OR STANDALONE ENVIRONMENT

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for managing a log retention period of an application in accordance with one or more embodiments of the invention.

FIGS. 4.1 and 4.2 show an example use case in accordance with one or more embodiments of the invention.

DETAILED DESCRIPTION

Figure 1:
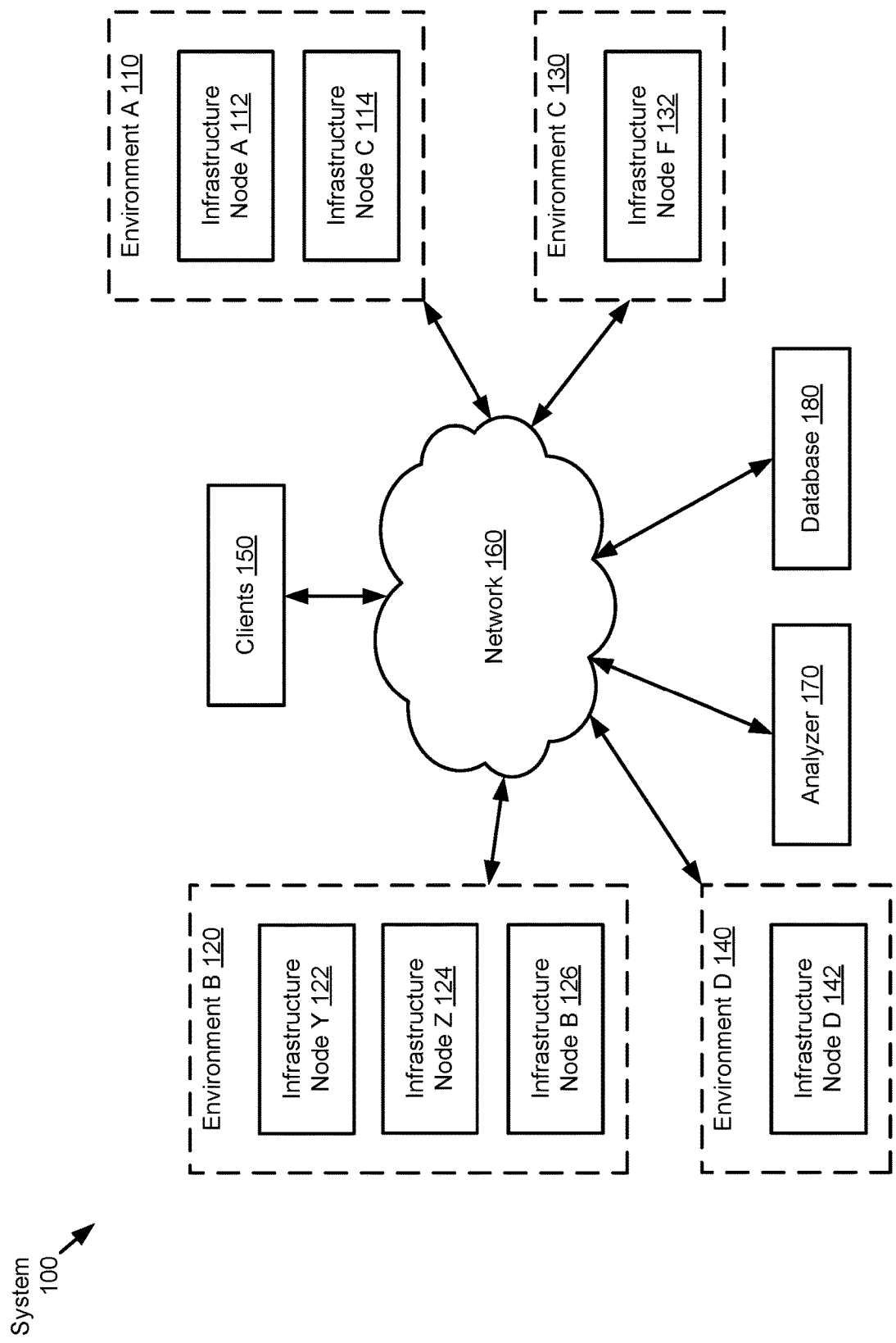
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, applications may be executed on a standalone environment (e.g., a standalone computing system; a computing device where applications being executed on the computing device itself, not being executed based on cloud computing; etc.) or on a distributed environment (where (i) data and software processing is distributed to reduce the impact of any site or hardware failure, and (ii) applications operate together (e.g., dependent on each other)), in which log data (including application logs and/or system logs) may be used to investigate outages (e.g., a communication/connectivity issue between Application A and Application B, and because of this issue, a user could not use a service provided by Application B), troubleshoot bugs (e.g., software related problems), and/or analyze security incidents (e.g., a data exfiltration event that occurred when a malicious user attempted to transfer a sensitive asset (e.g., a file, a folder, etc.) to an unauthorized removable storage media, a data loss event that occurred when a data theft attempted to upload a sensitive asset to an unauthorized file sharing website using an administrator credential, etc.).

When a license (e.g., a cloud storage solution license) is configured/obtained (by an administrator) to use one of the environments described above, one or more log management systems (e.g., a Splunk log management system, an ELK log management system, etc.) may be provided to that administrator (for example, to store logs for a period of time). By using a log management system (and from the corresponding logs), an administrator may, at least, (i) monitor one or more applications, (ii) detect particular log events (e.g., searching for an error in relation to a particular microservice) and patterns in log data (e.g., investigating log data using Kibana Query Language to infer how many times a specific error message is generated) with the help of a unique trace identifier (trace ID), (iii) monitor anomalies (e.g., experiencing a brute force attack for critical applications, where this attack may be detected because of unusually increased network traffic) and/or inactivities (e.g., to provide a service to a user, a polling job needs to be up every ten minutes; however, the polling job was not active over the last 1-hour) within the corresponding environment, and (iv) gauge health of the corresponding environment and its hardware/software components (e.g., a physical processor, a fan, a micro service, etc.).

Logs (e.g., application logs, system logs, etc.) may be crucial to (i) formulate/derive a device state chain (e.g., the collation and correlation of the past, present, and future device state paths) of a device, (ii) analyze that device's failure path, and (iii) infer what is going on with respect to applications executing on the device, or with respect to hardware components of the device. For example, assume here that 'B' is the "current state of the device" when an issue is generated. Based on that. (i) by employing a Natural Language Processing model, a previous device state of the device may be found (with 100% confidence) as 'A' and (ii) by employing a Markov chain model, next device states of the device may be calculated as 'C' and 'D', respectively. To this end, the device state chain may be configured as A→B→C→D.

In most cases, log management systems may retain logs based on static retention policies (for example, associated with the corresponding applications) and the cost to be paid may be determined as per the quota allocated (e.g., whenever a license is obtained, an administrator may be allowed to store application logs up to 1 terabytes (TB) (the "quota"), in which, within that 1 TB storage space, 250 gigabytes (GB) is allocated to Application X's logs for 50 days (it is fixed in terms of storage space and/or retention time, does not matter Application X is using that space or not) and another 250 GB is allocated to Application Y's logs for 100 days (it is fixed in terms of storage space and/or retention time, does not matter Application Y is using that space or not)). For example, assume here that Application A's application log is consuming 250 GB of data space (in a storage) with a retention policy of 90 days and Application B's application log is consuming 100 GB of data space (in the storage) with a retention policy of 120 days. However, the corresponding user never accessed these application logs until an error is occurred/detected within the corresponding computing device. With this static quota allocation, a user may have major problems such as, for example, an increasing storage space cost to an enterprise, utilization of more system resources that may lead no resilience/flexibility within the corresponding environment/ecosystem, etc. Currently, there is no mechanism or intelligence available to automatically adjust retention policies (associated with logs) so that more applications may store more log data (within limited storage space) and to further reduce the storage space cost to an enterprise. For at least these reasons, a fundamentally different approach is needed.

Embodiments of the invention relate to methods and systems to manage a log retention period of an application. More specifically, the embodiments of the invention may first infer dependencies and connectivity among applications executing on a distributed system, in which the applications are operatively connected through a network. Based on the inferred dependencies and connectivity, an application chain (AC) may be generated. The AC and distributed logs may then be analyzed to extract health parameters including, for example, an error count per request type, an error occurrence duration of an error, and a priority level of each application. Based on the health parameters and inferred dependencies among the applications, a failure score of the AC may then be derived.

Further, based on the distributed logs, a user access frequency (UAF) of each application log (AL) and remaining assigned storage space (RASS) for each AL may be inferred. The failure score of the AC. UAF of each AL, and RASS for each AL may then be analyzed. Based on the analysis, a first determination may be made as the failure score of the AC is greater than a predetermined failure score. Based on the first determination, a second determination may be made as the AC includes a high priority application (HPA). Thereafter, based on the second determination, a third determination may be made as the RASS for the HPA's AL is less than a predetermined storage space limit. Based on the third determination, an administrator may be notified to initiate obtaining of extra storage space prior to extending a current AL retention period of the HPA's AL. Finally, upon obtaining the extra storage space, the current AL retention period of the HPA's AL may be extended to a second AL period.

As a result of the processes discussed below, one or more embodiments disclosed herein advantageously ensure that: (i) a dynamic elasticity in a log retention period of an application (and its dependencies) is realized/provided (so that, with the elasticity in the application's quota, a user may onboard more applications through more effective usage of the assigned/available storage space) by tapping into logs, a UAF of each AL, and a RASS for each AL, (ii) based on the intelligent framework provided in (i), an administrator automatically adjusts retention policies of logs so that more applications store more log data (within limited storage space) and storage space cost to an enterprise is reduced further, (iii) a better storage space management is provided (based on, for example, ACs and the related predictions with respect to when a user usually checks an AL from a storage device and what should be the AL retention period of the corresponding application) so that when an AL (or AL data) of an application is no longer needed, the AL may be removed/deleted safely, (iv) usage of resources (e.g., the underlying devices that stores data) of the corresponding computing device is optimized for a better user experience, and (v) the resilience of the corresponding environment/ecosystem and the benefits provided by the environment are enhanced (for example, to provide a system with high interoperability, to improve the system's performance in scalability, and to provide an architecture that is extremely flexible to satisfy users' requirements (without altering an ongoing communication within the system or disrupting a service)).

The following describes various embodiments of the invention.

FIG. 1 shows a diagram of a system (100) in accordance with one or more embodiments of the invention. The system (100) includes any number of environments (e.g., Environment A (110), Environment B (120), Environment C (130), Environment D (140), etc.), any number of clients (150), a network (160), an analyzer (170), and a database (180). The system (100) may include additional, fewer, and/or different components without departing from scope of the invention. Each component may be operably connected to any of the other components via any combination of wired and/or wireless connections. Each component illustrated in FIG. 1 is discussed below.

In one or more embodiments, the clients (150), the environments (e.g., 120, 130, etc.), the analyzer (170), and the database (180) may be physical or logical devices, as discussed below. While FIG. 1 shows a specific configuration of the system (100), other configurations may be used without departing from the scope of the disclosure. For example, although the clients (150) and the environments (e.g., 110, 120, etc.) are shown to be operatively connected through the network (160), the clients (150) and the environments (e.g., 110, 120, etc.) may be directly connected, without an intervening communication network (e.g., 160).

As yet another example, the system (100) may include only one IN (as a standalone environment or a monolithic architecture) (i) to host, deliver, and/or manage most of the resources and services to be consumed by the users of the clients (150), and (ii) to generate and issue instructions to any other component of the system (100). In one or more embodiments, the standalone environment may include a large, tightly coupled application to perform the aforementioned functionalities.

Further, the functioning of the clients (150) and the environments (e.g., 110, 120, etc.) is not dependent upon the functioning and/or existence of the other device(s) in the system (100). Rather, the clients (150) and the environments (e.g., 110, 120, etc.) may function independently, and perform operations locally that do not require communication with other devices. Accordingly, embodiments disclosed herein should not be limited to the configuration of devices and/or components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may represent a distributed system (e.g., a distributed computing environment, a cloud computing infrastructure, etc.) that delivers at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (150). The system (100) may also represent a comprehensive middleware layer running on computing devices (e.g., 500, FIG. 5) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments (e.g., 110, 120, etc.). Further, the system (100) may be configured for workload placement collaboration and computing resource (e.g., processing, storage/memory, virtualization, networking, etc.) exchange.

To provide the aforementioned computer-implemented services to the users, the system (100) may perform some computations (e.g., data collection, distributed processing of collected data, etc.) locally (e.g., at the users' site using the clients (150)) and other computations remotely (e.g., away from the users' site using the environments (e.g., 110, 120, etc.)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

As used herein, a "distributed system" is a computing environment in which various components (e.g., IN A (112), IN F (132), etc.) are spread across multiple environments (e.g., 110, 120) on a network (e.g., 160). The distributed system may be configured for workload placement collaboration and computing resource (e.g., processing, storage/memory, virtualization, networking, etc.) exchange.

In one or more embodiments, the INs (e.g., 112, 132, etc.) may be directed to hosting and maintaining various workloads. For example, the INs (e.g., 112, 132, etc.) (more specifically, the microservices (e.g., a payroll microservice, an authentication microservice, etc.)) may split up a request (e.g., an operation, a task, an activity, etc.), coordinating their efforts to complete the request (e.g., to generate a response) more efficiently than if a single IN (e.g., a standalone environment) had been responsible for completing the request. Further, depending on user requirements, the system (100) may be configured to satisfy the user requirements. In this manner, there may be different types (e.g., models, architectures, etc.) of distributed systems, for example (but not limited to): client-server distributed systems, telecommunications networks, peer-to-peer networks, graphical and video-rendering systems, scientific computing (e.g., protein folding) systems, airline reservation systems, multiplayer video games, global supply chain management systems, etc.

Distributed systems may offer various advantages (e.g., features, characteristics, etc.) over conventional computing environments, for example (but not limited to): a reduced risk of a single point of failure, an improved reliability while completing a request, a higher processing-related fault tolerance, an ability to complete a request in a shorter period of time, scalability over time, heterogeneity, concurrency, transparency, etc. For example, an ability to scale as the size of a workload increases is an essential characteristic of distributed systems, achieved by adding additional INs (e.g., 112, 132, etc.) to the network (160) as needed.

As yet another example, with the help of the fault tolerance characteristics of distributed systems, if one of the microservices fails, an administrator of the corresponding environment may bypass the failed microservice and assign the task of that microservice to another available microservice. In this manner, the remaining microservices may continue to operate without disrupting an overall computation. As yet another example, with the help of the transparency characteristics of distributed systems, a user of the clients (150) may perceive a distributed system as a single computational environment, allowing the user to interact with a single logical device rather than being concerned with the system's infrastructure. The aforementioned examples are not intended to limit the scope of the invention.

As an example use case, a user of the clients (150) may send a task (e.g., rendering a video) to a distribution engine (not shown) of the system (100) that manages/distributes incoming tasks to available INs (e.g., 112, 132, etc.). After receiving the task, the distribution engine splits the task into pieces and provides one of the pieces (e.g., one frame of the video) to each of the INs (e.g., 112, 132, etc.) to complete the rendering. Once the frame is completed, the distribution engine provides another frame to each of the INs (e.g., 112, 132, etc.) and this process continues until the video is rendered (e.g., all pieces are put back together). In this manner, a complex task (like the video rendering task) may be completed in a matter of minutes as opposed to completing the task in days because of limited computing power of a single IN. The aforementioned example is not intended to limit the scope of the invention.

In one or more embodiments, the system (100) may include/support a distributed request tracing (also referred to herein as "distributed tracing") functionality that helps to monitor applications (e.g., 210A, 210N, etc., FIG. 2)—typically those built on a microservices architecture (discussed below)—that are commonly deployed to the system (100). Distributed tracing is a form of distributed computing to monitor operations of the applications (e.g., 210A, 210N, etc., FIG. 2) executing on the system (100).

Mostly in software development and information technology (IT) operations, users employ a distributed tracing to track the course of a request (or a transaction) as it travels through an application that is being monitored. For example, by employing a distributed tracing, an online credit card transaction (as it paves its way from a customer's initial purchase to the verification and approval process to the completion of the transaction) may be monitored. In this manner, users may monitor a request (and its corresponding response) step by step to pinpoint bottlenecks, bugs, and other issues that may impact the application's performance. The aforementioned example is not intended to limit the scope of the invention.

Tracing is a fundamental process employed by users (along with other forms of logging) to gather data (e.g., information) about an application's behavior; however, a conventional tracing may generate problems when it is used to troubleshoot applications (e.g., 210A, 210N, etc., FIG. 2) deployed to a distributed system (e.g., 100). In most cases, because microservices (e.g., applications, virtual services, etc.) scale independently, it is possible to have multiple iterations of a single service executing across different environments (e.g., servers) simultaneously, generating a complex path through which a request must travel. Without executing a distributed tracing, an application deployed to a microservices architecture and executing on a distributed system would be impossible to monitor with the conventional tracing designed for a single service application.

Further, in order to handle the considerable complexity of distributed computing environments, execution of distributed tracing may be necessary because: (i) it may track multiple applications/microservices and their corresponding operations simultaneously across numerous concurrent INs, (ii) it may track requests through each microservice, and (iii) it may provide an end-to-end narrative account of each request. In this manner, users and/or administrators may (i) monitor/track each iteration of a function, which enables them to conduct performance tracking by observing which instance of that function is causing the application to slow down and (ii) ascertain how a request travels through multiple applications (e.g., one microservice to the next), particularly when the users do not have enough insight into an implementation of the applications that are utilized. For example, consider a scenario where millions of users are playing an online video game. In this scenario, the microservices-driven applications may need to track (including but not limited to) (i) each user's location, (ii) each user's interaction with other users and with the system, and (iii) every item the user acquires. For this reason and in order to provide a smooth user experience, a distributed tracing may need to be used. The aforementioned example is not intended to limit the scope of the invention.

A distributed tracing starts the moment a user interacts with an application. For example, when a user sends a request (e.g., a Hypertext Transfer Protocol (HTTP) request), the request is assigned to a unique trace ID (for example, to track a status and health of the request). As the request travels through, every operation performed on it (called a "span" or a "child span") is tagged with the request's trace ID and the ID of an operation that originally generated the current request (called a "parent span"). In general, the span ID (e.g., a globally unique identifier (GUID)) represents a basic unit of work (e.g., sending the HTTP request). The trace ID includes one or more span IDs (forming a tree-like structure) and the trace ID will remain the same as one application calls the next application.

Further, each span ID is a single step on the request's journey and is encoded with data relate to an application that is performing an operation on the request. The data may include, for example (but not limited to): a service name of an application handling the request, an address of an application handling the request, a tag to query and filter the request by an identifier (e.g., a session ID), an error message in an event of a failure, etc. A distributed tracing tool (e.g., 170) may then correlate the data from all the spans and traces, and format them into visualizations that are available upon request through, for example, a web interface.

As yet another example, consider the following scenario: (i) a user starts an integrated development environment (IDE) and executes "http://localhost: 8080", and in turn, receives "Hello World" displayed on the IDE, (ii) the user adds "private static final Logger LOG=Logger.getLogger (XX.class.getName ( )" as a variable to an application class, (iii) the user changes the application class name to another class name and adds a log statement, (iv) the user then executes "http://localhost: 8080", and in turn, receives " . . . [XX-sample, 44462edc42f2ae73, 44462edc42f2ae73, false] . . . ", in which the second value is the trace ID, the third value is the span ID, and the last value indicates whether both IDs should be exported to a distributed tracing tool, (v) the user implements a representational state transfer (REST) template to call the IDE itself, and (vi) the user executes "http://localhost: 8080", and in turn, receives two logging statements displayed on the IDE as " . . . [XX-sample, 432943172b958030, 432943172b958030,false] . . . " and " . . . [XX-sample, 43294317269580030, b4d88156bc6a49ec, false] . . . ", in which both trace IDs are the same but the span IDs are different. As described above, the trace IDs allow the user to trace a request as it travels through one application to the next application. Further, the span IDs are different because the user has two different "unit of work" occurring, one for each request.

The aforementioned examples are not intended to limit the scope of the invention.

As discussed above, the system (100) may further include one or more INs (e.g., 112, 132, etc.) that are deployed in different environments (e.g., 110, 140, etc.). For example, (i) IN A (112) and IN C (114) are deployed to Environment A (110), (ii) IN Y (122), IN Z (124), and IN B (126) are deployed to Environment B (120), (iii) IN F (132) is deployed to Environment C (130), and (iv) IN D (142) is deployed to Environment D (140).

In one or more embodiments, each environment may include any number of INs without departing from the scope of the invention. Further, each environment may be, for example (but not limited to): a cloud computing service platform (e.g., Microsoft Azure®, Pivotal Cloud Foundry®, etc.), a distributed caching database (e.g., a Redis Enterprise® distributed caching database), a database (e.g., an Oracle® database, a SAP® Hana database, etc.), a server (e.g., an Apache Tomcat® server), etc. The aforementioned examples are not intended to limit the scope of the invention.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 500, FIG. 5) that have different quantities of computing resources (e.g., processing cycles, memory, storage, etc.) to provide a consistent user experience to the users.

As used herein, a "distributed cache" is a system that pools together random access memory (RAM) of multiple networked nodes (e.g., INs) into a single in-memory database (used as a data cache) to provide faster access to data. Typically, most caches are located in one computing device (e.g., a physical server), whereas distributed caches may extend beyond the memory limits of a single computing device with the help of a distributed system architecture for larger capacity and increased processing power. Distributed caches may be used for different use cases, for example (but not limited to): accelerating an application, storing web session data, reducing network traffic, reducing an impact of interruptions, etc.

As used herein, a "cloud" refers to servers that are accessed over the Internet (and the software and databases that executes on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

In one or more embodiments, an IN (e.g., 112, 132, etc.) may be a physical computing device or a logical computing device (e.g., a VM) configured for hosting one or more workloads, or for providing a computing environment (e.g., computing power and storage) whereon workloads may be implemented. Further, an IN (e.g., 112, 132, etc.) may exchange data with other INs (e.g., 112, 132, etc.) registered in/to the network (160) in order to participate in a collaborative workload placement. One of ordinary skill will appreciate that an IN (e.g., 112, 132, etc.) may perform other functionalities without departing from the scope of the invention. Examples of an IN (e.g., 112, 132, etc.) may include (but not limited to): an enterprise server, a modular server, a blade server, a mainframe, a workstation computer, etc. In one or more embodiments, an IN (e.g., 112, 132, etc.) may be a heterogeneous set, including different types of hardware components and/or different types of operating systems (OSs). Additional details of an IN are described below in reference to FIG. 2.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), an application executable or code, an application configuration, a hardware resources configuration, a supporting services configuration, a network connectivity configuration, etc.

In one or more embodiments, in order to serve a request received from a user, (i) an application (e.g., 210A, 210N, etc., FIG. 2) executing on an IN (e.g., 112, 132, etc.) may connect to (e.g., communicate with) one another executing on another IN (e.g., 112, 132, etc.) through the network (160), and/or (ii) an application executing on a specific IN (e.g., 112, 132, etc.) may communicate with one another executing on the same IN (e.g., 112, 132, etc.). In one or more embodiments, the "communication" may include a simple data passing, or it may include two or more applications coordinating some activity.

As discussed above, to provide a response to a request, the request may travel through multiple layers (e.g., multiple INs) of the system (100) in order to, for example, generate the response. For example, consider a scenario in which an application executing on IN Y (122) receives a search request from a user through the network (160). In this scenario, upon receiving the request, the application executing on IN Y (122) communicates with an application executing on IN A (112) and sends the request through the network (160). The application executing on IN A (112) then communicates with an application executing on IN C (114) and sends the request. The application executing on IN C (114) then communicates with an application executing on IN F (132) and sends the request through the network (160).

The application executing on IN F (132) then communicates back to the application executing on IN C (114) and provides a response (to the request) through the network (160). Similar to how the application executing on IN C (114) is received the request from the application executing on IN A (112), the application executing on IN C (114)

provides the response back to the application executing on IN A (112). The application executing on IN A (112) then provides the response back to the application executing on IN Y (122) through the network (160). The application executing on IN Y (122) then provides the response to the user through the network (160). The aforementioned example is not intended to limit the scope of the invention.

In one or more embodiments, while performing one or more operations requested by a user and/or an administrator of the clients (150), an application may include functionality to request and use resources (e.g., data, computing resources, etc.) of any IN (e.g., 112, 132, etc.) available in the system (100). The applications may perform other types of functionalities not listed above without departing from the scope of the invention. In one or more embodiments, the administrator may be a user with permission (e.g., a user that has root-level access) to make changes on the clients (150) that will affect other users of the clients (150).

In one or more embodiments, because, for example, IN A (112) and IN Y (122) are located in different environments (110 and 120, respectively), there may be a security breach while IN Y (122) is trying to communicate with IN A (112). However, because a user and/or an administrator (of the system (100)) has already obtained the required service access licenses for both environments, IN Y (122) can communicate with IN A (112) without causing a security breach.

In one or more embodiments, a microservice architecture (also referred to herein as "a microservice") is a software approach in which a single application is composed of many loosely coupled and independently deployable smaller services that communicate over well-defined APIs. This approach may allow a large application to be divided into smaller independent parts (with each part having its own responsibility), and may provide a framework to develop, deploy, and maintain microservices independently (to support a decentralized software development effort).

Further, in this approach: (i) each microservice may have its own (e.g., allocated) technology stack (e.g., memory, a central processing unit (CPU), data management model, etc.), (ii) each microservice may communicate with one another over a combination of REST APIs, message brokers, and/or event streaming, (iii) a combination of microservices make applications easier to scale and faster to develop, (iv) each microservice may be updated, deployed, and scaled to meet demand for specific functions of an application. (v) each microservice may be designed to perform a set of tasks without affecting the functioning of other microservices and without sharing any of its implementation with other microservices. (vi) each microservice may be tailored to handle a specific task without following a "one-size-fits-all" method, and (vii) the independence of microservices increases an application's resistance to failure (where the application may handle a service failure by degrading functionality and not crashing the entire application).

Comparing to a monolithic architecture (e.g., the stand-alone environment), microservices compose a single application from many smaller, loosely coupled services as opposed to the monolithic approach of a large, tightly coupled application (which executes as a single service). For example, if a process of an application experiences a spike in demand, an entire monolithic architecture may need to be scaled. As yet another example, in a monolithic architecture, if a single component fails, that component may cause the related application to fail.

As yet another example, to serve a single request, a microservices-based application may call on many other (internal) microservices to compose its response. In most cases, containers (as a well-suited microservices architecture) are preferred because they allow a user to develop services without worrying about the dependencies. The microservices architecture may be used for, for example (but not limited to): website migration, media (e.g., images, videos, etc.) content storage, payment processing and ordering, data processing, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of CPU, memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS make a container lightweight, fast, and portable.

Applications may need to communicate with one another with a minimum amount of latency. For this reason, in most cases, REST APIs are used for communications between the applications. The term "REST" defines a set of rules and constraints that need to be followed when building the services. Any application that adheres to those rules and constraints will be able to communicate via a set of uniform, shared, and stateless operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use HTTP to communicate. More specifically, REST APIs communicate via HTTP to perform standard database functions such as creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

In one or more embodiments, an application/microservice may communicate with one another via ports. For example, in order to establish a connection between an application (e.g., Application A (App. A)) executing on IN A (112) and an application (e.g., App. B) executing on IN B (126), App. A's corresponding port (e.g., port 443, port 1521, port 8881, etc.) and App. B's corresponding port should be open (e.g., active, on, etc.). Otherwise, App. A may not communicate with App. B in order to, for example, transfer data or coordinate some activity.

As used herein, a "port" is a number representing communication endpoints in computer networking. A port is an unsigned 16-bit integer (0-65535) that identifies a specific process or a network service. In most cases, a port may use a transmission control protocol (TCP) or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP can be used in combination with Internet Protocol (IP) and it facilitates a transmission of datagrams from one application to another application. However, unlike the TCP, the UDP does not guarantee a reliable communication. This means that it is up to the application (that received the message) to process any errors and verify the delivery.

Further, even if the corresponding ports of App. A and App. B are open (and they are ready to communicate), IN A (112) and IN B (126) should allow the communication between App. A and App. B. For this reason, the ports that will be used for the communication should also be opened in IN A (112) and in IN B (126). More specifically, these ports should be opened in the firewall of IN A (112) and of IN B (126). Otherwise, App. A may not communicate with App. B, even if their corresponding ports are ready to communicate.

To prevent that, for example, IN A (112) may make an API call to IN B (126). As described herein, an "API call" may refer to a process of an application or a computing device submitting a request to an API to retrieve the requested data from an external application or an external computing device. Based on receiving the API call from IN A (112), IN B (126) may send a connection string to IN A (112). IN A (112) may then use that connection string to connect to IN B (126). In one or more embodiments, the connection string may be a data structure that includes one or more parameters (e.g., a location of a database, an authentication information for a database, etc.) required for IN A (112) to connect to IN B (126).

Figure 2:
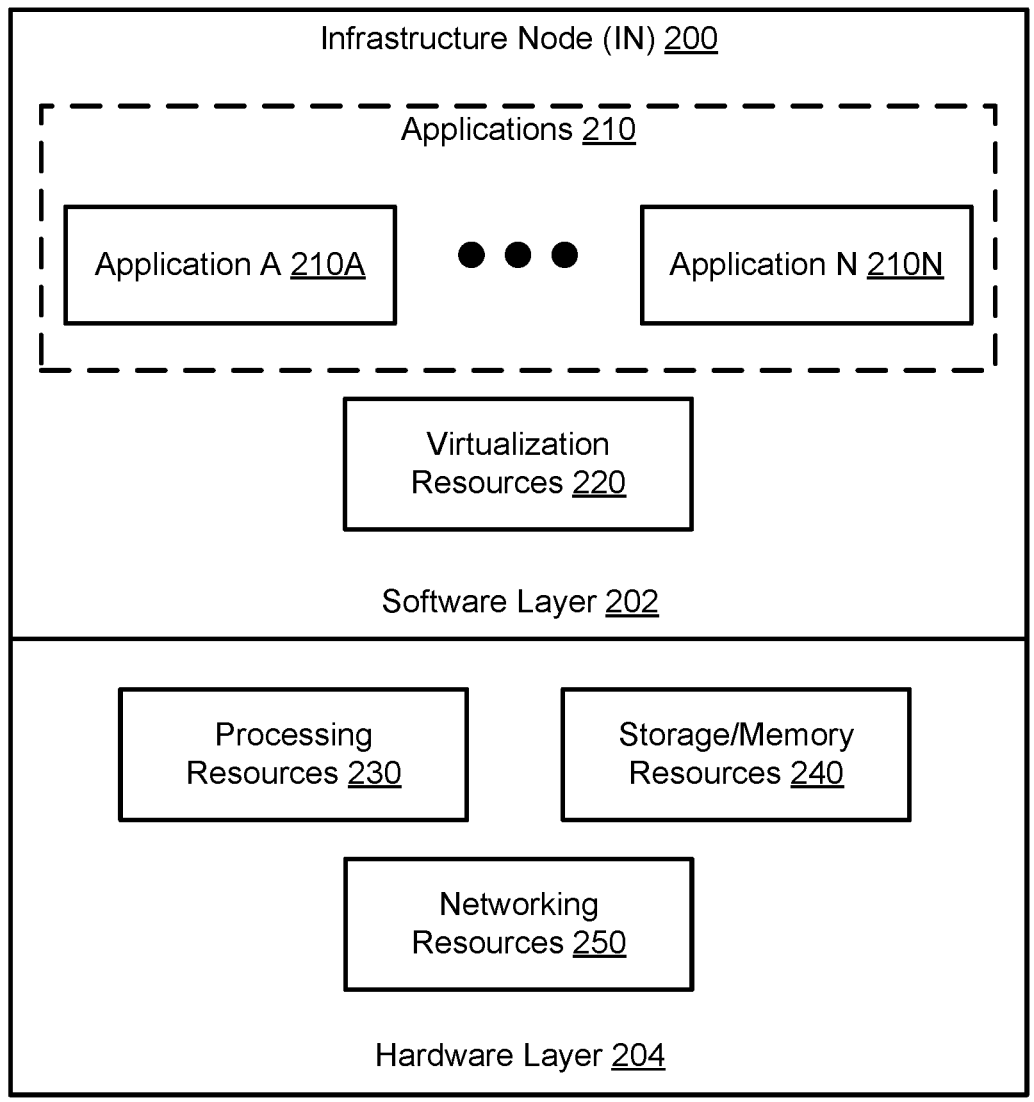
FIG. 2 shows a diagram of an infrastructure node (IN) in accordance with one or more embodiments of the invention.

In one or more embodiments, IN B (126) may be offline for, for example, a system maintenance to configure and upgrade its processing resources (e.g., 230, FIG. 2). While IN B (126) is offline, the connection between IN A (112) and IN B (126) may be disconnected. When IN B (126) comes back online, IN A (112) may reconnect to IN B (126) using the same connection string.

As used herein, a "firewall" is a network monitoring/security component that monitors incoming and outgoing network traffic, in which it decides whether to allow or block specific traffic based on a defined set of security rules. A firewall may be, for example (but not limited to): a hardware component, a software component, a software-as-a-service (SaaS), a private cloud, etc. The aforementioned example is not intended to limit the scope of the invention.

A firewall may monitor network traffic (e.g., an amount of data moving across a network at any given time) to determine, for example (but not limited to): network availability, unusual activities on a network, etc. In most cases, an unusual activity (e.g., an unusually high amount of network traffic) on a network may be a sign of a security issue (e.g., a malicious attack). Because of the determined unusual activity, the firewall may notify an administrator (e.g., a network service provider (NSP) of the network. Based on receiving the notification from the firewall, the NSP of the network may reconfigure the network to fix the security issue.

Figure 5:
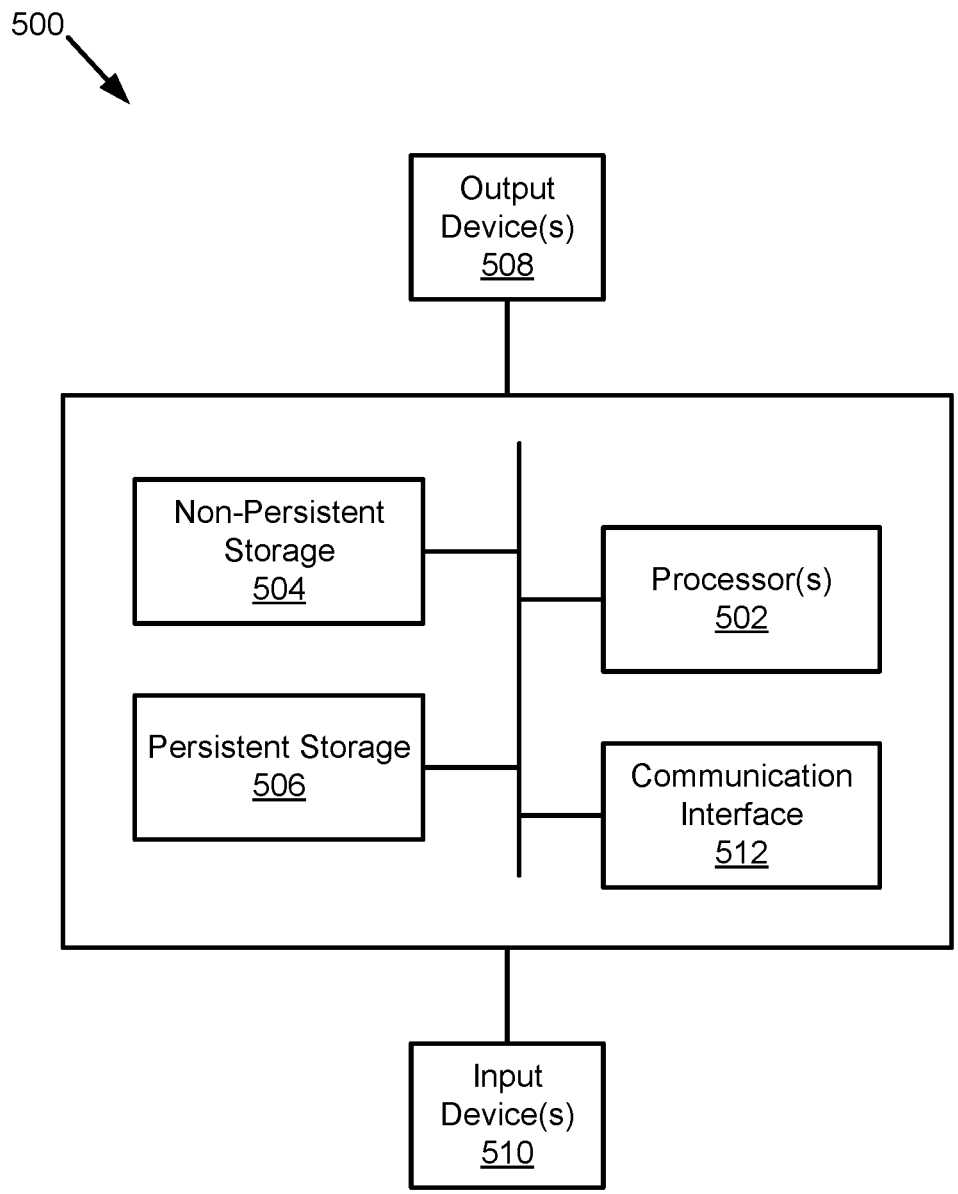
FIG. 5 shows a diagram of a computing device in accordance with one or more embodiments of the invention.

In one or more embodiments, the INs (e.g., 112, 132, etc.) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, solid-state drives (SSDs), etc.). The computing device may include instructions, stored in the persistent storage, that when executed by the processor(s) of the computing device, cause the computing device to perform the functionality of the INs (e.g., 112, 132, etc.) described throughout this application.

Alternatively, in one or more embodiments, the INs (e.g., 112, 132, etc.) may be implemented as logical devices. A logical device may utilize the computing resources of any number of computing devices to provide the functionality of the INs (e.g., 112, 132, etc.) described throughout this application.

In one or more embodiments, the clients (150) may provide computer-implemented services to users of the clients (150) (and/or other devices such as, other clients or other types of devices). The clients (150) may provide any number and any type of computer-implemented services (e.g., data storage services, electronic communication services, etc.). The clients (150) may correspond to computing devices that one or more users use to interact with one or more components of the system (100). The clients (150) may be physical or logical devices, as discussed below.

In one or more embodiments, a client may include any number of applications (and/or content accessible through the applications) that provide computer-implemented application services to a user. Applications may be designed and configured to perform one or more functions instantiated by a user of the client. Examples of an application may include (but not limited to): a word processor, a media player, a web browser, a file viewer, an image editor, etc.

In order to provide application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components/resources of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

To provide computer-implemented services, entities hosted by the clients (150) may utilize data from any number of resources. For example, the clients (150) may utilize data stored in storage/memory resources (e.g., 240, FIG. 2). The clients (150) may utilize data from other resources without departing from the invention.

In one or more embodiments, the clients (150) may issue requests to INs (e.g., 112, 132, etc.) to (i) receive responses and (ii) interact with various components of INs (e.g., 112, 132, etc.) (described below). The clients (150) may also request data and/or send data to INs (e.g., 112, 132, etc.). Further, the clients (150) may initiate an application to execute on one or more INs (e.g., 112, 132, etc.) such that the application may (itself) gather, transmit, and/or otherwise manipulate data located on the INs (e.g., 112, 132, etc.), remote to the clients (150). When the clients (150) interact with the INs (e.g., 112, 132, etc.), data that is relevant to the clients (150) may be stored (temporarily or permanently) in the INs (e.g., 112, 132, etc.). In one or more embodiments, the clients (150) may share access to the same INs (e.g., 112, 132, etc.) and may similarly share any data located on those INs (e.g., 112, 132, etc.).

In one or more embodiments, the clients (150) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (150) described throughout this application.

Alternatively, in one or more embodiments, similar to the INs (e.g., 112, 132, etc.), the clients (150) may also be implemented as logical devices.

In one or more embodiments, users may interact with (or operate) the clients (150) in order to perform work-related tasks. The accessibility of users to the clients (150) may depend on a regulation set by an administrator of the clients (150). To this end, each user may have a personalized user account that may, for example, grant access to certain data, applications, and computing resources of the clients (150), and this may be realized by implementing "virtualization" technology.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, an IN (e.g., 112, 132, etc.) may be capable of providing a range of functionalities/services to users of the clients (150). However, not all of the users may be allowed to receive all of the services. To manage the services provided to the users of the clients (150), a system (e.g., a service manager) in accordance with embodiments of the invention may manage the operation of the network (160), in which the clients are operably connected to the IN (e.g., 112, 132, etc.).

Specifically, the service manager (i) may identify services to be provided by the IN (e.g., 112, 132, etc.) (for example, based on the number of users using the clients (150)) and (ii) may limit communications of the clients (150) to receive IN (e.g., 112, 132, etc.) provided services. For example, the priority (e.g., the user access level) of a user may be used to determine how to manage computing resources of the IN (e.g., 112, 132, etc.) to provide services to that user. As yet another example, the priority of a user may be used to identify the services that need to be provided to that user. As yet another example, the priority of a user may be used to determine how quickly communications (for the purposes of providing services in cooperation with the network (160) (and its subcomponents)) are to be processed by the network (160).

Further, consider a scenario where a first user is to be treated as a normal user (e.g., a user with a user access level/tier of 4/10). In such a scenario, the user level of that user may indicate that certain ports (of the subcomponents of the network (160) corresponding to communication protocols such as TCP, UDP, etc.) are to be opened, other ports are to be blocked/disabled so that (i) certain services are to be provided to the user by the IN (e.g., 112, 132, etc.) (while the IN (e.g., 112, 132, etc.) may be capable of performing/providing any number of remote computer-implemented services, the IN may be limited in providing some of the services over the network (160)) and (ii) network traffic from that user is to be afforded a normal level of quality (e.g., a normal processing rate with a limited communication bandwidth (BW)). By doing so, (i) computer-implemented services provided to the users of the clients (150) may be granularly configured without modifying the operation(s) of the clients (150) and (ii) the overhead for managing the services of the clients (150) may be reduced by not requiring modification of the operation(s) of the clients (150) directly.

In contrast, a second user may be determined to be a high priority user (e.g., a user with a user access level of 9/10). In such a case, the user level of that user may indicate that more ports are to be opened than were for the first user so that (i) the IN (e.g., 112, 132, etc.) may provide more services to the second user and (ii) network traffic from that user is to be afforded a high level of quality (e.g., a higher processing rate than the traffic from the normal user).

In one or more embodiments, the network (160) (or the "network environment") may represent a (decentralized or distributed) computing network and/or fabric configured for computing resource and/or messages exchange among registered computing devices (e.g., the INs (e.g., 112, 132, etc.)). As discussed above, components of the system (100) may operatively connect to one another through the network (160) (e.g., a storage area network (SAN), a personal area network (PAN), a local area network (LAN), a metropolitan area network (MAN), a wide area network (WAN), a mobile network, a wireless LAN (WLAN), a virtual private network (VPN), an intranet, the Internet, etc.), which facilitates the communication of signals, data, and/or messages. In one or more embodiments, the network (160) may be implemented using any combination of wired and/or wireless network topologies, and the network (160) may be operably connected to the Internet or other networks. Further, the network (160) may enable interactions between, for example, the INs (e.g., 112, 132, etc.) through any number and type of wired and/or wireless network protocols (e.g., TCP, UDP, IPv4, etc.). Further, the network (160) may be configured to perform all, or a portion, of the functionality described in FIGS. 3.1-3.3.

The network (160) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more INs (e.g., 112, 132, etc.) in the network (160), and (iii) limiting communication(s) on a granular level (e.g., on a per-port level, on a per-sending device level, etc.). The network (160) and its subcomponents may be implemented using hardware, software, or any combination thereof.

In one or more embodiments, before communicating data over the network (160), the data may first be broken into smaller batches (e.g., data packets) so that larger size data can be communicated efficiently. For this reason, the network-enabled subcomponents may break data into data packets. The network-enabled subcomponents may then route each data packet in the network (160) to distribute network traffic uniformly.

In one or more embodiments, the network-enabled subcomponents may decide how real-time network traffic and non-real-time network traffic should be managed in the network (160). In one or more embodiments, the real-time network traffic may be high priority (e.g., urgent, immediate, etc.) network traffic. For this reason, data packets of the real-time network traffic may need to be prioritized in the network (160). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (160). The non-real-time network traffic may include data packets related to, for example (but not limited to): File Transfer Protocol (FTP) for web publishing, email applications, etc.

In one or more embodiments, for example, when the analyzer (170) communicates with another IN Y (122) over the network (160), the analyzer (170) may transmit data structures (e.g., lists, tables, etc.) having a predetermined format in accordance with a communication protocol implemented by the IN Y (122), the network (160), and/or the analyzer (170).

In one or more embodiments, when providing different types of computer-implemented services, the INs (e.g., 112, 132, etc.) may communicate with the clients (150) using different ports (e.g., file transfer protocol (FTP) port 20, network time protocol (NTP) port 123, etc.). Consequently, different functionalities of the services provided by the INs (e.g., 112, 132, etc.) may be dependent on being able to communicate with the clients (150) via different ports. If such communications are made inoperable, then the INs (e.g., 112, 132, etc.) may be prevented from providing functionalities of the services corresponding to the respective ports.

As discussed above, a distributed system is composed of several applications calling each other to complete an operation (e.g., generating a response to a request). Each of these applications emits its own logs and often stores them in different locations within the distributed system (including the database (180)). This process may be called as "distributed logging". In most cases, for an easier post-analysis (e.g., parsing, distributed tracing, etc.), each application may structure its log in a standard format, such as JavaScript Object Notation (JSON).

Distributed logging is a practice of keeping log files decentralized, specifically in large-scale distributed systems, because (by nature) applications executing on those systems generates a lot of logs, making centralized logging more burdensome and less cost effective. In most cases, logging in a distributed system is not a difficult task; however, inferring (e.g., making sense of) the distributed logs from a logical point of view may be cumbersome.

To overcome this (e.g., to address the loosely coupled, modular nature of microservice architecture), the analyzer (170) may use distributed tracing (described above) to correlate the distributed logs coming from different applications to get a logical view of all logs relevant to the processing of a specific request. While correlating, the analyzer (170) may use the parameters available in the distributed logs (discussed below) in order to, for example (but not limited to): trace a specific request through a distributed system, identify potential errors (e.g., performance issues) occurred while processing a specific request (e.g., which application was down while processing a specific request, which request caused an application to went down, what is the health of an application and its dependencies, etc.), trace requests that display high latency across all applications, reduce mean time to troubleshooting performance issues, get immediate root-cause identification of every application impact, improve user experience by re-establishing end-to-end interoperability, etc.

In one or more embodiments, the analyzer (170) may include functionality to, e.g.: (i) obtain (or receive) distributed logs (described below) for each application executing on a distributed system (e.g., 100) from, for example, the database (180), (ii) execute distributed tracing on the distributed logs to infer the dependencies among applications (e.g., which applications are working together) and to infer the connectivity among applications (e.g., which ports are open), (iii) based on the inferred dependencies and inferred connectivity among the applications (with the help of trace IDs and span IDs), generate an AC (e.g., a relationship tree), (iv) analyze logs (e.g., application logs, system logs, etc.) and an AC to extract at least an error count per request type (where, for example, an application may include functionality to process/serve multiple REST requests in parallel), an error occurrence duration, and a priority level of each application included in the AC. (v) derive, by employing a set of linear, non-linear, and/or machine learning (ML) models (e.g., a multiple linear regression approach/model) and based on (iv), a failure score of the AC based on the error count per request type, error occurrence duration, priority level of each application, and dependencies among the applications (said another way, determine health of the applications in the AC (in real-time (e.g., on the order of milliseconds or less)) based on errors (and characteristics of those errors (e.g., a security incident, an outage, an error count per request type, an error occurrence duration, etc.))

observed in the corresponding logs), (vi) based on the logs (analyzed in (iv)), infer, at least, an UAF of each AL and RASS for each AL (e.g., remaining left to reach threshold quota), (vii) based on (v) and (vi), analyze the failure score of the AC, UAF of each AL, and RASS for each AL, (obtained in (v)), (viii) by employing a set of linear, non-linear, and/or machine learning ML models, and based on (vii) and a priority of an application in the AC, realize/provide a dynamic elasticity in a log retention period of an application (and its dependencies) (so that, with the elasticity in the application's quota, a user may onboard more applications (in a cost effective way) through more effective usage of the assigned/available storage space (within the quota) to store AL data and/or application data), (ix) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) of applications (by obtaining telemetry data or logs) to identify (a) which application is a healthy application (e.g., an application that generates a response to a request) and (b) which application is an unhealthy application (e.g., an application that does not generate a response to a request, an over-provisioned microservice, an application is slowing down in terms of performance, an application's resource utilization value is exceeding a predetermined maximum resource utilization value threshold, an application is unhealthy because its status code is 503, etc.), (x) based on (ix), manage health of each application, (xi) identify health of each application based on average, minimum, and maximum resource utilization values, (xii) provide identified health of each application to other entities (e.g., administrators), (xiii) automatically react and generate alerts (e.g., a predictive alert, a proactive alert, a technical alert, etc.) if one of the predetermined maximum resource utilization value thresholds is exceeded, (xiv) manage log space usage by predicting how long to retain logs, and (xv) store (temporarily or permanently) the aforementioned data and/or the output(s) of the above-discussed processes in the database (180).

In one or more embodiments, information (e.g., resource utilization levels, logs, etc.) may be obtained as they become available or by the analyzer (170) polling the corresponding IN (e.g., 112, 132, etc.) (by making an API call to the corresponding IN) for new information. Based on receiving the API call from the analyzer (170), the IN (e.g., 112, 132, etc.) may allow the analyzer (170) to obtain the information.

In one or more embodiments, the aforementioned information may be obtained (or streamed) continuously (without affecting production workloads of the corresponding IN (e.g., 112, 132, etc.)), as they generated, or they may be obtained in batches, for example, in scenarios where (i) the analyzer (170) receives a failure score calculation request (e.g., a health check request), (ii) the corresponding IN (e.g., 112, 132, etc.) accumulates the information and provides them to the analyzer (170) at fixed time intervals, or (iii) the corresponding IN (e.g., 112, 132, etc.) stores the information in its storage (or in an external entity (e.g., 180)) and notifies the analyzer (170) to access the information from its storage or from the external entity. In one or more embodiments, the information may be access-protected for the transmission from the corresponding IN (e.g., 112, 132, etc.) to the analyzer (170), e.g., using encryption.

In one or more embodiments, the analyzer (170) may monitor service performance and resource utilization of each microservice (for, for example, troubleshooting and optimization) by obtaining telemetry data about each microservice's technology stack (e.g., telemetry data about computing resources of each microservice) from the corresponding IN (e.g., 112, 132, etc.). In one example, the analyzer (170) may: (i) monitor actions being performed, computation power being consumed, communications being sent or received, etc. by each microservice, (ii) monitor communications being sent or received by each microservice by intercepting them as they traverse from one microservice to another, (iii) based on the intercepted communications, determine utilization rates of one or more resources by a microservice, and (iv) store (temporarily or permanently) the resource utilization rates (e.g., including estimates, measurements, etc.) in the database (180).

In one or more embodiments, while monitoring, the analyzer (170) may need to, for example (but not limited to): inventory one or more components of each microservice, obtain a type and a model of a component of a microservice, obtain a version of firmware or other code executing on a microservice, obtain information regarding a hardware component or a software component of the corresponding IN (e.g., 112, 132, etc.) that may be allocated to a microservice, obtain information specifying each microservice's interaction with one another and/or with another component of the corresponding IN (e.g., 112, 132, etc.), etc.

In one or more embodiments, in order to manage the health of microservices (in particular, the health of the unhealthy microservices) and resolve bottlenecks without affecting the operation of the entire distributed computing architecture, one or more preventive (and proactive) actions may be taken. In one or more embodiments, a preventive action may be, for example (but not limited to): performing workload redistribution among microservices (e.g., high performance load balancing) (for example, to prevent workload mismatch between microservices and to manage the overall operation of the architecture), reducing the quantity of unnecessary REST API calls (for example, to prevent unnecessary memory utilization and to improve the likelihood that the unhealthy microservices are healthy again), modifying (e.g., adding, removing, etc.) resources allocated to a microservice (for example, to ensure highly available microservices), modifying a predetermined maximum resource utilization value threshold (e.g., increasing a predetermined maximum CPU utilization value threshold from 70% to 88% so that Microservice A may take more workloads), testing (in terms of resource utilization and workload assignment) a new microservice that will be added into the an IN before causing an impact on the IN, etc.

One of ordinary skill will appreciate that the analyzer (170) may perform other functionalities without departing from the scope of the invention. When providing its functionalities, the analyzer (170) may perform all, or a portion, of the methods illustrated in FIGS. 3.1-3.3.

In one or more embodiments, a priority level (or a priority class) of an application may be based on, for example (but not limited to): an application's tolerance for downtime, a size of an application, a relationship of an application to other applications (for example, in an AC), etc.

In one or more embodiments, one or more applications may be classified based on each application's tolerance for downtime. For example, based on the classification, an application may be assigned to one of three classes: Class I application, Class II application, and Class III application. In one or more embodiments, (i) Class I application may be an application that cannot tolerate downtime, (ii) Class II application may be an application that may tolerate a period of downtime (e.g., an hour or other period of time determined by an administrator or a user), and (iii) Class III application may be an application that may tolerate any amount of downtime.

In one or more embodiments, a distributed log may include (or may specify), for example (but not limited to): an application log (described below), a system log (described below), a timestamp showing when a specific request is processed by an application, a port number, a protocol type associated with a port number, computing resource details and an IP address of an IN hosting an application where a specific request is processed, an identifier of an application, computing resource details and an IP address of a client who sent a specific request, etc. The aforementioned example is not intended to limit the scope of the invention.

For example, consider a scenario in which App. X (executing on IN Y (122)) receives a request from a user through the network (160). Upon receiving the request, App. X communicates with App. Y (executing on IN A (112)) and sends the request to App. Y through the network (160). App. Y then communicates with App. Z (executing on IN C (114)) and sends the request. App. Z then communicates back to App. Y and provides a response (to the request) to App. Y. Similar to how App. Y is received the request from App. X, App. Y provides the response back to App. X. App. X then provides the response to the user through the network (160).

For the above scenario, while executing a back-tracing process (e.g., distributed tracing) based on the distributed logs, the analyzer (170) may assign a unique trace ID for the request (to understand, for example, how the request is actually handled across the corresponding microservices). As the request moves through the distributed system, the analyzer (170) may assign a set of span IDs for every new process that is needed along the journey. For example, the analyzer (170) may assign (i) "trace ID: a, span ID: 1" to App. X, (ii) "trace ID: a, span ID: 2" to App. Y, and (iii) "trace ID: a, span ID: 3" to App. Z.

As indicated, when one application calls the next application, the trace ID remains the same, but each applications is marked with a different span ID (to specify which applications processed the request). Consequently, based on the above-executed distributed tracing process, the analyzer (170) infers that, for example, (i) the request passed through Apps. X-Z (respectively) and (ii) Apps. X-Z are operating together (e.g., dependent on each other).

In one or more embodiments, a distributed system (or a distributed computing architecture) may be based on different types of microservices, for example (but not limited to): a business microservice (e.g., data management services), a core microservice (e.g., authentication services, workflow management services, etc.), an infrastructure microservice (e.g., database services), etc. A business microservice may be configured to protect, for example (but not limited to): a VM, a database application, a container, components of a file system, etc. As being a policy or a workflow management microservice, a core microservice may be configured to orchestrate an operation(s) of the business microservice. Further, an infrastructure microservice may be configured to check whether, for example (but not limited to): a core microservice is performing its tasks, a business microservice is performing its tasks, a user is an authenticated user to use a service provided by an IN (e.g., 112, 132, etc.), etc. In one or more embodiments, the above-discussed microservices may be configured to perform a data protection operation and in order to perform that operation, a request that is received from a user of the clients (150) may travel through multiple layers of the system (100).

For example, consider a scenario in which a user of the clients (150) configures a service level agreement (SLA) to protect (e.g., to backup, to restore, to manage, etc.) one or more applications executing on the database (180). The user then sends a data protection request to the corresponding IN (e.g., 112, 124, etc.) in order to protect application data of those applications. In this scenario, an input agent of the IN may transfer the received request to a core microservice of the IN. After receiving the request, the core microservice may communicate (using, for example, REST APIs) with an authentication microservice (for example, of another IN) to verify whether the user is an authenticated user. The authentication microservice may then notify (using, for example, REST APIs) the core microservice indicating that the user is an authenticated user and provide a token to the core microservice.

Upon receiving the token, the core microservice may initiate protection of the database (and its application data). In this manner, the core microservice may first check (and verify) the SLA configured by the user and determine which database needs to be protected. The core microservice may then generate a "database backup job" and dispatches the job to a business microservice (for example, of another IN). Upon receiving the job, the business microservice may orchestrate the protection of the database (180) by communicating with other INs. Thereafter, the corresponding IN may start backing up the database (180) to a target device (e.g., a data domain). While backing up, the business microservice may obtain a status (e.g., currently active, completed, etc.) of the backup operation (e.g., 55% of the backup operation is completed, 100% of the backup operation is completed, etc.) from the target device. In this manner, a complex job (like the database backup job) may be completed in a matter of minutes as opposed to completing the job in days because of limited computing power of a single microservice. The aforementioned example is not intended to limit the scope of the invention.

In one or more embodiments, the analyzer (170) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the analyzer (170) described throughout this application.

Alternatively, in one or more embodiments, similar to the INs (e.g., 112, 132, etc.), the analyzer (170) may also be implemented as a logical device.

In one or more embodiments, application logs may include (or specify), for example (but not limited to): warnings and/or errors (e.g., unknown software exception (0xc00d) occurred in the application at location 0x0007d) occurred in a software component, an identifier (e.g., a name) of an asset, an identifier of a parent folder containing an asset (where the parent folder may be a folder that is one level higher than a current directory of an asset in a file system hierarchy), a size of an asset (where the size of an asset may specify how much storage volume the asset consumes), an offset for data of an asset stored in storage (where the offset for an asset's data may be a pointer that points to one or more blocks of storage that store the data), one or more attributes of an asset (which may specify, for example, Asset A should be read-only, Asset B should be hidden, etc.), an access control list (ACL) of an asset (which may specify a user with a user level of 7 (out of 10) or above can access the asset), a discrete file system activity data that is recorded in an agent (e.g., a timestamp of an activity, an identifier of a user who interacted with an asset, an identifier of a computing device, etc.), a type of an asset, a number of users interacting with an asset, a number of asset size changes, an identifier of an application, a product identifier of an application, a type of an activity (e.g., asset read, asset created, asset modified, asset renamed, asset copied, asset deleted, asset access denied, asset security changed, asset moved, etc.), a description of an activity, a directory of a source asset, a type of a file system (e.g., a new technology file system (NTFS), a resilient file system (ReFS), etc.), etc.

In one or more embodiments, system logs may include (or specify), for example (but not limited to): a media access control (MAC) address of a computing device, a type of a computing device, an identifier of an OS executing on a computing device, a network connectivity detail (e.g., a network identifier, a category of the network, etc.) of a client, transition of device states, an alert for medium level of CPU overheating, important keywords for a hardware component (e.g., recommended maximum CPU operating temperature is 75° C.), a transition from one device state to another device state (e.g., fan failure→overheating of CPU, fan failure→memory module failure, etc.), an alert indicating that a recommended maximum CPU operating temperature is exceeded, etc.

In one or more embodiments of the invention, important keywords and/or alerts for a hardware component or a computing device may be selected by a vendor of the device, by a technical support specialist, by another individual or entity, or any combination thereof. The important keywords and/or alerts may be specific technical terms or vendor specific terms that are used in the system log files.

In one or more embodiments, the database (180) may be a fully managed cloud (or local) database (or any logical container) that acts as a shared storage or memory (simply storage/memory) resource that is functional to store unstructured and/or structured data. Further, the database (180) may also occupy a portion of a physical storage/memory device or, alternatively, may span across multiple physical storage/memory devices.

In one or more embodiments, the database (180) may be implemented using physical devices that provide data storage services (e.g., storing data and providing copies of previously stored data). The devices that provide data storage services may include hardware devices and/or logical devices. For example, the database (180) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (180) may include a memory device (e.g., a dual in-line memory device), in which data is stored and from which copies of previously stored data are provided. As yet another example, the database (180) may include a persistent storage device (e.g., an SSD), in which data is stored and from which copies of previously stored data is provided. As yet another example, the database (180) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (180) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, in a standalone environment, an application may send logs to a vendor and the vendor may store the logs in an external and/or internal database. Similarly, in a distributed environment, applications may send logs to the vendor and the vendor may store the logs in the external and/or internal database.

In one or more embodiments, the database (180) may store/record (temporarily or permanently) unstructured and/or structured data that may include (or specify), for example (but not limited to): an application log, a system log, a user type (e.g., a knowledge worker, a power worker, a task worker with relatively low-end compute requirements, a high-end user that requires a rich multimedia experience, etc.), an index of an asset, a backup history documentation of a workload, recently obtained customer information (e.g., records, credentials, etc.), a cumulative history of initiated model training operations (e.g., sessions) over a prolonged period of time, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain data available in the database (180)), a cumulative history of initiated data backup operations over a prolonged period of time, a cumulative history of initiated data restore operations over a prolonged period of time, one or more policies/rules/settings for the operation (or configuration) of any component of an IN (e.g., 112, 132, etc.), a data protection policy (e.g., an SLA, an affinity-based backup policy, a data protection policy that dictates 30 days retention at the database (180), etc.) implemented by an administrator of an IN (e.g., 112, 132, etc.) (for example, to protect the IN, to perform a rapid recovery, etc.), a configuration setting of that policy, a number of each type of a set of data protection policies implemented by an administrator of an IN (e.g., 112, 132, etc.), recently obtained user/customer activity records (e.g., metadata), a cumulative history of customer activity records obtained over a prolonged period of time, an identifier of a vendor, an identifier of a customer, customer data, a list of instructions, a setting of an application, a version of an application, a version of an OS, a display resolution configuration of a client, a product identifier of an application, an amount of storage used by an application, a language setting of an OS, a serial number of a client, a hardware identification number of a hardware component, an identifier of a client's manufacturer, an identifier of a client, a type of a client, a profile of a valid user, a profile of an invalid user, one or more outputs of the processes performed by the analyzer (170), one or more outputs of the processes performed by a component of an IN (e.g., 112, 132, etc.), a workload allocation table, a workload priority ranking, a resource health ranking, information regarding the services that are to be provided to users of the clients (150) (where the information may include, for example, identifiers of the users, priority of the users (to determine how to marshal limited computing resources in the system (100)), solution or workaround documents of previous hardware component failures, existing knowledge base (KB) articles (which may include remediation, software version, and/or component information for previous hardware component failures), device user guides, device release notes, videos and/or community forum questions and answers, a post posted by a user, a security fix, monitored resource utilization data/ value of each application (to generate and store a resource utilization map, which may indicate, for example, Microservice A's CPU utilization is 26%, Microservice B's graphical processing unit (GPU) utilization is 38%, an amount of storage or memory resource utilized by a microservice, an amount of networking resource utilized by a microservice to perform a network operation (e.g., to publish and coordinate inter-process communications), an amount of bare metal communications executed by a microservice (e.g., input/ output (I/O) operations executed by a microservice per second), resource utilization rates over time, power consumption of microservices while utilized by a user, a certain file operation performed by a microservice, an identifier of a microservice and a resource that have been allocated to that microservice, workload performance data of a microservice, a resource (e.g., processing, storage/memory, networking, a quantity of file descriptors utilized by a process that is executed by a microservice, a quantity of threads utilized by a process that is executed by a microservice, etc.) utilization rate of a microservice over time, information regarding an operation of a microservice that may be utilized to manage the operation of that microservice, information regarding duplicative data stored by a microservice for data integrity purposes, information regarding redundantly performed workloads by a microservice to meet a user's requirements, information regarding an encryption scheme utilized by a microservice to prevent unauthorized access of data, an amount of storage or memory resource utilized by a microservice, etc. Based on the aforementioned data, for example, the analyzer (170) may perform user analytics (i) to infer profiles of users communicating with the INs (e.g., 112, 132, etc.) and (ii) to infer how badly a request is being processed by the INs (e.g., 112, 132, etc.).

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the database (180) may provide an indexing service. More specifically, an agent of the database (180) may receive various data protection related inputs directly (or indirectly) from the analyzer (170) (or indirectly from the clients (150)). Upon receiving, the agent may analyze those inputs to generate an index(es) (e.g., a data backup operation index(es)) for optimizing the performance of the database (180) by reducing a required amount of database access(es) when implementing a request (e.g., a data retrieval request). In this manner, requested data may be quickly located and accessed from the database (180) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the analyzer (170). The analyzer (170) may add, remove, and/or modify those data in the database (180) to cause the information included in the database (180) to reflect the latest version of, for example, SLAs. The unstructured and/or structured data available in the database (180) may be implemented using, for example, lists, tables, unstructured data, structured data, etc. While described as being stored locally, the unstructured and/or structured data may be stored remotely, and may be distributed across any number of devices without departing from the scope of the invention.

While the database (180) has been illustrated and described as including a limited number and type of data, the database (180) may store additional, less, and/or different data without departing from the scope of the invention. In the embodiments described above, the database (180) is demonstrated as a separate entity from the analyzer (170); however, embodiments herein are not limited as such. In one or more embodiments, the database (180) may be a part of the analyzer (170).

One of ordinary skill will appreciate that the database (180) may perform other functionalities without departing from the scope of the invention. When providing its functionalities, the database (180) may perform all, or a portion, of the methods illustrated in FIGS. 3.1-3.3.

In one or more embodiments, the database (180) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the database (180) described throughout the application.

Alternatively, in one or more embodiments, similar to the INs (e.g., 112, 132, etc.), the database (180) may also be implemented as a logical device.

Turning now to FIG. 2, FIG. 2 shows a diagram of an IN (200) in accordance with one or more embodiments of the invention. The IN (200) may be any one of the INs (e.g., 112, 132, etc.) discussed above in reference to FIG. 1. The IN (200) may include a hardware layer (204) and a software layer (202). The IN (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the hardware layer (204) is a collection of physical components configured to perform operations of the IN (200) and/or otherwise execute a collection of logical components (e.g., applications (210), virtualization resources (220), etc.) of the software layer (202).

In one or more embodiments, a processing resource (e.g., 230) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a data processing unit (DPU), etc.

In one or more embodiments, a storage or memory resource (e.g., 240) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data in the IN (200). Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in the IN (200). The data stored may be accessed almost instantly (e.g., in milliseconds) regardless of where the data is stored in memory. The memory may provide the above-mentioned instant data access because the memory may be directly connected to a CPU (described above) on a wide and fast bus (e.g., a high-speed internal connection that transfers data among hardware components of the IN (200)).

In one or more embodiments, the hardware layer (204) may further include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources (240), and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, a networking resource (e.g., 250) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one embodiment of the invention, a networking resource (e.g., 250) may provide capabilities to interface the IN (200) with external entities (e.g., the clients (e.g., 150, FIG. 1), other INs (e.g., 112, 132, etc., FIG. 1), etc.) and to allow for the transmission and receipt of data with those devices. A networking resource (e.g., 250) may communicate via any suitable form of wired interface (e.g., Ethernet, fiber optic, serial communication etc.) and/or wireless interface, and may utilize one or more protocols (e.g., TCP, UDP, Remote Direct Memory Access, IEEE 801.11, etc.) for the transmission and receipt of data.

In one or more embodiments, a networking resource (e.g., 250) may implement and/or support the above-mentioned protocols to enable the communication between the IN (200) and the external entities. For example, a networking resource (e.g., 250) may enable the IN (200) to be operatively connected, via Ethernet, using a TCP protocol to form a "network fabric", and may enable the communication of data between the IN (200) and the external entities. In one or more embodiments, each IN (e.g., IN (200)) within the distributed system (e.g., 100, FIG. 1) may be given a unique identifier (e.g., an IP address) to be used when utilizing the above-mentioned protocols.

Further, in one or more embodiments, a networking resource (e.g., 250), when using certain a protocol or variant thereof, supports streamlined access to storage/memory media of other INs in the distributed system (e.g., 100, FIG. 1). For example, when utilizing remote direct memory access (RDMA) to access data on another IN (e.g., 112, 132, etc., FIG. 1) in the distributed system (e.g., 100, FIG. 1), it may not be necessary to interact with the software layer (e.g., 202) of that IN. Rather, when using RDMA, it may be possible for the networking resource (e.g., 250) to interact with the hardware layer (e.g., 204) of that IN to retrieve and/or transmit data, thereby avoiding any higher-level processing by the software layer (e.g., 202) executing on that IN.

In one or more embodiments, the software layer (202) may include virtualization resources (220) and applications (210) (and/or content accessible through the applications (210)). The applications (210) may vary in different embodiments, but in certain embodiments, the applications (210) may be custom developed or commercial (e.g., off-the-shelf) applications that an organization or a user desire to execute in the distributed system (e.g., 100, FIG. 1).

In one or more embodiments, the applications (210) may be implemented as computer instructions, e.g., computer code, stored in the storage/memory resources (240) that when executed by the processing resources (230) cause the IN (200) to provide the functionality of the applications (210) described throughout this application. Each of the applications (e.g., 210A, 210N, etc.) may include functionality to provide computer-implement services, for example (but not limited to): a workload placement collaboration, serving (e.g., processing) a request, sharing a distributed log, receiving computing resource details of an IN, transmitting a request, analyzing data, streaming video, etc. Those skilled in the art will appreciate that the applications (210) may perform other functionalities without departing from the scope of the invention.

In one or more embodiments, while the applications (210) provide computer-implemented services to the clients (e.g., 150, FIG. 1), the applications (210) may store data that may be relevant to the clients (e.g., 150, FIG. 1) to the storage/memory resources (240). When the client-relevant data is stored, the client-relevant data may be subjected to loss, inaccessibility, or other undesirable characteristics based on the operation of the storage/memory resources (240).

To mitigate, limit, and/or prevent such undesirable characteristics, users of the clients (e.g., 150, FIG. 1) may enter into agreements (e.g., SLAs) with providers of the storage/ memory resources (240). These agreements may limit the potential exposure of client-relevant data to undesirable characteristics. The agreements may, for example, require duplication of client-relevant data to other locations so that if the storage/memory resources (240) fails, another copy (or other data structure usable to recover the data on the storage/memory resources (240)) of the client-relevant data may be obtained. The agreements may specify other types of activities to be performed with respect to the storage/memory resources (240) without departing from the invention.

In one or more embodiments, each of the applications (e.g., 210A, 210N, etc.) may include a virtual address space. A virtual address space may be a simulated range of addresses (e.g., identifiable locations) that mimics physical locations of one or more components of the hardware layer (204). In most cases, an application is not configured to identify the physical locations of the components of the hardware layer (204); rather, the application relies on other components of the IN (200) to translate one or more virtual addresses of the virtual address space to one or more physical addresses of the components of the hardware layer (204). Accordingly, in one or more embodiments, an application may utilize a virtual address space to read, write, and/or otherwise manipulate data, without being configured to directly identify the physical address of that data within the components of the hardware layer (204).

Further, each of the applications (e.g., 210A, 210N, etc.) may communicate with other components of the IN (200) to establish a mapping between a virtual address space and the components of the hardware layer (204). In one or more embodiments, when a mapping is established, an application's use of the virtual address space enables the application to directly manipulate data in the hardware layer (204), without relying on other components of the IN (200) to repeatedly update mappings between the virtual address space and the physical addresses of the components of the hardware layer (204).

In one or more embodiments, a virtualization resource (e.g., 220) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the IN (200) or using computing resources of other INs connected to the IN (200). The VM (and applications hosted by the VM) may generate data (e.g., VM data) that is stored in the storage/memory resources (240), in which the VM data may reflect a state of the VM. In one or more embodiments, the VM may provide services to the clients (e.g., 150, FIG. 1), and may host instances of databases, email servers, or other applications that are accessible to the clients (e.g., 150, FIG. 1).

In one or more embodiments, the virtualization resources (220) may include a hypervisor, in which the hypervisor may be configured to orchestrate an operation of the VM by allocating computing resources of the IN (200) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on the storage/memory resources (240) that when executed by the processing resources (230) cause the IN (200) to provide the functionality of the hypervisor.

While FIG. 2 shows a specific configuration of an IN, other configurations may be used without departing from the scope of the disclosure. Accordingly, embodiments disclosed herein should not be limited to the configuration of devices and/or components shown in FIG. 2.

FIGS. 3.1-3.3 show a method for managing a log retention period of an application in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed analyzer (e.g., 170, FIG. 1). Other components of the distributed system (100) illustrated in FIG. 1 may also execute all or part of the method shown in FIG. 3.1 without departing from the scope of the invention.

In Step 300, the analyzer obtains (e.g., gathers) distributed logs (e.g., telemetry data) for each application executing on a distributed system (e.g., 100, FIG. 1). In one or more embodiments, the analyzer may make an API call to, for example, the storage/memory resources (e.g., 240, FIG. 2) of IN A (e.g., 112, FIG. 1) to obtain the distributed logs stored in IN A. Based on receiving the API call from the analyzer, the storage/memory resources of IN A may allow the analyzer to obtain the distributed logs.

In one or more embodiments, distributed logs may be obtained, for example, by a storage/memory agent of IN A pushing the logs as they become available, or by the analyzer polling the storage/memory agent (e.g., by making an API call to the storage/memory agent) for new logs. Based on receiving the API call from the analyzer, the storage/memory agent may allow the analyzer to obtain the logs.

The distributed logs may be obtained (or streamed) continuously (without affecting production workloads of the corresponding IN(s)), as they generated, or they may be obtained in batches, for example, in scenarios where (i) the analyzer receives a failure score calculation request, (ii) the corresponding IN(s) accumulates logs and provides them to the analyzer at fixed time intervals, or (iii) the corresponding IN(s) stores the logs in the database (e.g., 180, FIG. 1), and notifies the analyzer to access the logs from the database. In one or more embodiments, the logs may be access-protected for a transmission from the corresponding IN(s) to the analyzer, e.g., using encryption.

In one or more embodiments, as part of the distributed logs, the analyzer may obtain resource utilization data (e.g., key performance metrics) of microservices by, for example (but not limited to): monitoring actions being performed, computation power being consumed, communications being sent or received, etc. by each microservice; monitoring communications being sent or received (by each microservice) by intercepting them as they traverse from one microservice to another, determining (based on intercepted communications) utilization rates of one or more resources by a microservice, etc.

In one or more embodiments, in addition to the distributed logs, the analyzer may also obtain one or more alerts that are triggered at the corresponding IN(s). For example, based on a failed cloud disaster recovery operation (which is initiated by a user), the corresponding IN may generate a failure alert. Thereafter, the analyzer may store (temporarily or permanently) those alerts in the database. In this manner, the analyzer may obtain more information regarding, e.g., (i) the operations performed and/or failures occurred in the corresponding IN, and (ii) one or more reasons of those failures.

In one or more embodiments, the analyzer may make an API call to, for example, the database to obtain the distributed logs stored in the database. Based on receiving the API call from the analyzer, the agent of the database may allow the analyzer to obtain the distributed logs. Details of the database, distributed logs, application, and IN have been described above in reference to FIGS. 1 and 2, respectively.

In Step 302, the analyzer executes distributed tracing on the distributed logs (obtained in Step 300) to infer dependencies and connectivity among the applications. Said another way, by executing a distributed tracing, the analyzer may analyze the distributed logs in order to extract data that is relevant to (related to or associate with) at least dependencies and connectivity among the applications. Execution of the distributed tracing may entail processing of computer readable program code or computing instructions reflected thereby. In one or more embodiments, the relevant data may include, for example (but not limited to): a trace ID, a span ID, a version of an application, a version of an OS, etc. Details of the distributed tracing, trace ID, and span ID have been described above in reference to FIG. 1.

In Step 304, based on the relevant data (extracted in Step 302), the analyzer infers dependencies and connectivity among the applications. For example, consider a scenario in which App. K (executing on IN Y (e.g., 122, FIG. 1)) receives a search request from a user through a network (e.g., 160, FIG. 1). Upon receiving the search request, App. K communicates with App. L (executing on IN A (e.g., 112, FIG. 1)) and sends the search request to App. L through the network. App. L then communicates with App. M (executing on IN D (e.g., 142, FIG. 1)) and sends the search request to App. M through the network. App. M then communicates back to App. L and provides a response (to the search request) through the network. However, on the way back, App. L could not provide the response to App. K because App. L went down (for example, due to a critical level of CPU overheating issue in IN A after sending the search request to App. M).

For the above scenario, based on the relevant data, the analyzer assigns a unique trace ID for the search request. As the search request moves through the distributed system, the analyzer assigns a set of span IDs for every new process that is needed along the journey. For example, the recommendation engine assigns (i) "trace ID: xx, span ID: 1" to App. K, (ii) "trace ID: xx, span ID: 2" to App. L, and (iii) "trace ID: xx, span ID: 3" to App. M. Based on the assigned IDs (and other parameters available in the relevant data), the analyzer infers that (i) the search request travelled through Apps. K-M (respectively), (ii) Apps. K-M are operating together (e.g., dependent on each other), and (iii) ports 443, 1521, and 8881 are open and used by Apps. K-M (e.g., connectivity among Apps. K-M). The aforementioned example is not intended to limit the scope of the invention.

Thereafter, based on the inferred dependencies and inferred connectivity among the applications (with the help of trace IDs and span IDs ((i) to track activities across microservices and (ii) to understand whether or not a request (received from a user) is processed successfully (because otherwise, until all microservices successfully process the request, the distributed system cannot provide a response to the user))), the analyzer may generate an AC (e.g., a relationship tree). In one or more embodiments, to determine the dependencies and connectivity among the applications, other methods such as, for example, volume mapped dependency and network mapped dependency among applications may be implemented, in which (i) the volume mapped dependency may be identified using a Docker® engine and (ii) the network mapped dependency may be identified using netstat or similar commands.

In Step 306, the analyzer analyzes logs (obtained in Step 300) and AC (generated in Step 304) to extract, at least, the health parameters (or performance indicators) such as an error count per request type (where, for example, an application may include functionality to process/serve multiple REST requests in parallel), an error occurrence duration, and a priority level of each application included in the AC.

As discussed above in reference to FIG. 1, in one or more embodiments, with the help of distributed logs (including or specifying, at least, application logs and system logs), users and/or the analyzer may, e.g.: (i) monitor each iteration or process step in the AC to conduct performance tracking by observing/detecting, for example, a reason(s) (e.g., App. K's 503 service is unavailable, fan failure is reported, connection time out is reported, data is not available in the database, etc.) that is causing an application in the AC to slow down (or crash), (ii) ascertain how a request travels through multiple applications (e.g., one microservice to the next), particularly when users do not have enough insight with respect to an implementation of the applications that are called, (iii) ascertain what is the health of the corresponding IN(s) where the corresponding applications execute on (e.g., users may identify a root cause of a hardware component failure (occurred in the corresponding IN) using a device state chain (e.g., the collation and correlation of the past, present, and future device state paths)).

In one or more embodiments, in order to generate a device state chain (using, at least, the distributed logs that show a transition of device states for the corresponding IN), the analyzer may, e.g.: (i) when a hardware component failure (e.g., a fan failure) is reported, generate a device state path (for the IN) from a healthy device state to an unhealthy device state (to understand how the failure has occurred because there may be a strong correlation between the device state path and a root cause of the failure), (ii) predict a next device state (of the IN) based on a current device state (which may be obtained automatically at periodic intervals and/or manually when manually requested by an administrator), and (iii) generate the device state chain using the device state path (which corresponds to the device states up to the current device state), current device state, and next device state. As indicated, while generating the device state chain, not just the previous device state is considered, but the whole device state path is considered.

In one or more embodiments, a healthy device state corresponds to a device state in which the device (i.e., the IN) is operating as expected; while an unhealthy device state is a device state in which the device is operating outside of its expected operating parameters (which may be defined, for example, by a vendor, a user of the device, any other entity, or any combination thereof).

In one or more embodiments, the predicted next device state and generated device state chain may be stored in the database. For example, all the device state paths corresponding to a specific device and/or all the device state paths of all the devices may be stored in the database. Further, in addition to the information of a hardware component (which reported the hardware component failure), the type of the hardware component failure and the severity of the failure may also be stored/recorded in the database. For example, IN F (e.g., 132, FIG. 1) reports a critical printed circuit board failure. The type of the failure is recorded as aging of battery and the device state path for IN F is obtained as printed circuit board failure→system crash. In another example, IN C (e.g., 114, FIG. 1) reports a critical fan failure. The type of the failure is recorded as dust and the device state path for IN C is obtained as fan failure→overheating of CPU→CPU failure→system crash.

In one or more embodiments, the analyzer may predict a next device state of a device by implementing a Markov chain model (or any other suitable model), in which the next device state is predicted based on the current device state of the device (i.e., the device state where the hardware component failure was reported). Further, the analyzer may include a list of device states where the device transitioned and, among the list of device states, the next device state that has the highest probability to become the next device state.

For example, assume here that when a hardware component failure (e.g., CPU failure, memory module failure, etc.) has occurred, to be able to create a device state chain, a device state path (e.g., including a previous device state (device state A)) may be obtained from the database and a next device state (e.g., device state C) may be predicted by the Markov chain model. In this example, the device state chain may be generated as A→B (where B is a current state of the device) and B→C, where A represents the fan failure, B represents the overheating of CPU, and C represents the CPU failure. The probability of A→B in the device state chain may be calculated as 0.2 by implementing the Markov chain model in reverse. The probability of B→C in the device state chain may be calculated as 0.3 by performing the Markov chain model. Overall, in this example, the probability of the device state chain may be calculated as 0.06.

In another example, the device state chain may be generated as A→B and B→E (e.g., another probable next device state), where A represents the fan failure, B represents the overheating of CPU, and E represents the storage device failure. The probability of A→B in the device state chain may be calculated as 0.2 by performing the Markov chain model in reverse. The probability of B→E in the device state chain may be calculated as 0.1 by performing the Markov chain model. Overall, in this example, the probability of the device state chain may be calculated as 0.02.

Thereafter, a root cause of the hardware component failure may be identified using the above-generated device state chains. To this end, "A→B→C" device state chain may be considered to provide solutions, because the probability of A→B→C device state chain, in terms of the root cause of the hardware component failure, is higher than the probability of "A→B→E" device state chain. This approach may provide more in-depth information regarding the root cause of the hardware component failure, because considering only the problematic device state may be not sufficient to identify the root cause.

In Step 308, (i) by employing a set of linear, non-linear, and/or ML models (e.g., a multiple linear regression model that includes weighted parameters (e.g., w1, w2, w3, wn, etc.)), and (ii) based on the health parameters and dependencies among the applications, the analyzer derives a failure score of the AC (more specifically, the analyzer derives a failure score of each application in the AC by weighting multiple performance indicators of each application). For example, for a monolithic application executing on a standalone environment, the analyzer may derive an application failure score for that application. However, for dependent applications executing on a distributed environment, the analyzer may derive a failure score of the corresponding AC (which still depends on a failure score of each application in the AC).

In one or more embodiments, based on the multiple linear regression model, input features, and corresponding parameters/coefficients, the analyzer may generate the following equation: failure score of the AC=C (e.g., a constant term that is an output of a linear model fitting procedure)+number of requests per request type×error count per request type×w1+number of requests per request type×error occurrence duration per request type (e.g., two errors are detected within the last 12-hour interval)×w2+a priority of App. 1×w3+application dependency of App. 1×priority of App. 1×wn+ . . . in which a higher failure score may indicate that the AC is unhealthy.

In one or more embodiments, depending on the situation, an administrator may send a request (with respect to the generated equation) to the analyzer so that the aforementioned coefficients may be adjusted to operate inversely. Further, the administrator may re-fit the regression model when new data becomes available because of a particular user or a use case.

In one or more embodiments, based on the identified health of each application, the analyzer may tag each application accordingly. In order to tag an application based on its identified health, the analyzer, for example: (i) may employ a set of linear, non-linear, and/or ML models, or (ii) may include one or more configuration instructions. By employing a model or based on configuration instructions, the analyzer may, for example (but not limited to): tag an application (e.g., App. N) as a "LOW" performing application, tag an application (e.g., App. J) as a "HIGH" performing application, etc.

In one or more embodiments, once the failure score of the AC is derived, the analyzer may store (temporarily or permanently) the score and tagging information of each application in the AC in the database. In this manner, for example, performance of each application may be tracked over time.

In Step 310, based on the logs (analyzed in Step 306), the analyzer infers, at least, an UAF of each AL and RASS for each AL.

Turning now to FIG. 3.2, the method shown in FIG. 3.2 may be executed by, for example, the above-discussed analyzer. Other components of the system (100) illustrated in FIG. 1 may also execute all or part of the method shown in FIG. 3.2 without departing from the scope of the invention.

In Step 312, the analyzer analyzes the failure score of the AC (derived in Step 308 of FIG. 3.1), UAF of each AL, and RASS for each AL (inferred in Step 310 of FIG. 3.1) to (i) optimize a log retention period of an application and (ii) to realize/provide a dynamic elasticity in a log retention period of an application (and its dependencies) (so that, with the elasticity in the application's quota, a user may onboard more applications (in a cost effective way) through more effective usage of the assigned/available storage space (within the quota) to store AL data and/or application data).

In Step 314, based on the analysis (performed in Step 312), the analyzer makes a first determination as to whether the failure score of the AC is greater than or equal to a predetermined failure score. Accordingly, in one or more embodiments, if the result of the first determination is YES (meaning that there are errors reported in the logs), the method proceeds to Step 316. If the result of the first determination is NO (meaning that there are no errors reported in the logs), the method alternatively proceeds to Step 330.

In Step 316, as a result of the first determination in Step 314 being YES, the analyzer makes a second determination as to whether the AC includes any high priority applications (e.g., a Class I application). Accordingly, in one or more embodiments, if the result of the second determination is YES, the method proceeds to Step 318. If the result of the second determination is NO, the method alternatively proceeds to Step 326.

As indicated in Step 320, a priority of an application is one of the factors used to determine whether or not a current AL retention period of a high priority application should be extended (automatically) (so that an administrator may still have access to the corresponding AL(s) at a later point in time to resolve an issue with respect to the high priority application).

In Step 318, as a result of the second determination in Step 316 being YES, the analyzer makes a third determination as to whether the high priority application's RASS is less than or equal to a predetermined storage space limit. Accordingly, in one or more embodiments, if the result of the third determination is YES, the method proceeds to Step 320. If the result of the third determination is NO, the method alternatively proceeds to Step 322.

In Step 320, as a result of the third determination in Step 318 being YES, the analyzer notifies the corresponding administrator to initiate configuring of extra storage space before extending the current AL retention period of the high priority application. To this end, the analyzer may send a recommendation/request/command (e.g., please configure extra storage space for App. K for a better user experience) to the administrator as pre-loaded instructions (e.g., present in the database) and/or via other methods.

As used herein, "AL retention" is a period of time, with a definite start and end, within which the log data of an application should be retained in storage (e.g., 180, etc.). For example, a set of user requirements and/or technical considerations (e.g., security considerations, performance considerations, etc.) of an IN may be used to generate an AL retention policy specifying that log data of an application should be retained in the storage for three months.

Further, the analyzer may include a recommendation monitoring service to monitor whether the provided recommendation is implemented by the administrator. The recommendation monitoring service may be a computer program that may be executed on the underlying hardware of the analyzer. The recommendation monitoring service may be designed and configured to facilitate remote access to check whether extra storage space is configured. Based on monitoring, if the administrator did not take an action, the analyzer may resend the recommendation to the administrator. In one or more embodiments, the analyzer may then store (temporarily or permanently) the recommendation in the database.

In one or more embodiment, once the extra storage space is configured (by the administrator), the analyzer may send a feedback, via a GUI, to the administrator about the completion of the configuration. As used herein, "configuring" may mean (i) configuring current storage space that is not used for this purpose before or (ii) provisioning extra storage space (e.g., obtaining a license for extra storage space).

In Step 322, as a result of the third determination in Step 318 being NO or after performing Step 320, the analyzer extends the current AL retention period of the high priority application (e.g., to provide a long(er)-term log data retention) without exceeding a maximum allowed AL retention period (which may be determined by the corresponding administrator).

In Step 324, because of their dependencies on the high priority application, the analyzer keeps the current AL retention period of each of the remaining applications in the AC as-is. In one or more embodiments, after performing Steps 322 and 324, the analyzer may initiate notification of the administrator about the current AL retention period of each application in the AC. The notification may be displayed on a GUI of, for example, the corresponding IN.

In one or more embodiments, the method may end following Step 324.

In Step 326, as a result of the second determination in Step 316 being NO, the analyzer makes a fourth determination as to whether a UAF of an application's AL is greater than or equal to a predetermined access threshold value. Accordingly, in one or more embodiments, if the result of the fourth determination is YES, the method proceeds to Step 332 of FIG. 3.3. If the result of the determination is NO, the method alternatively proceeds to Step 328. In one or more embodiments, Step 326 may be repeated for each of the remaining applications in the AC.

In Step 328, as a result of the fourth determination in Step 326 being NO, the analyzer keeps a current AL period of the related application (in the AC) as-is (because (i) the result of the first determination was YES and (ii) the result of the second determination was NO). In one or more embodiments, after performing Steps 326 and 328, the analyzer may initiate notification of the administrator about the current AL retention period of each application in the AC. The notification may be displayed on the GUI of, for example, the corresponding IN.

In one or more embodiments, the method may end following Step 328.

In Step 330, as a result of the first determination in Step 314 being NO (meaning that an AL of an application is no longer needed and the AL may be removed/deleted safely), the analyzer reduces/optimizes the current AL retention period of each application in the AC for a better storage space management so that: (i) more applications may store more log data (within limited storage space), (ii) storage space cost to an enterprise may be reduced (by releasing some portions of the limited storage space), (iii) the resilience of the corresponding environment/ecosystem and the benefits provided by the environment are enhanced, and (iv) usage of resources of the corresponding IN is optimized for a better user experience.

In one or more embodiments, after performing Step 330, the analyzer may initiate notification of the administrator about the current AL retention period of each application in the AC. The notification may be displayed on the GUI of, for example, the corresponding IN.

In one or more embodiments, the method may end following Step 330.

Turning now to FIG. 3.3, the method shown in FIG. 3.3 may be executed by, for example, the above-discussed analyzer. Other components of the system (100) illustrated in FIG. 1 may also execute all or part of the method shown in FIG. 3.3 without departing from the scope of the invention.

In Step 332, as a result of the fourth determination in Step 326 of FIG. 3.2 being YES, the analyzer makes a fifth determination as to whether the related application's RASS is less than or equal to a predetermined storage space amount. Accordingly, in one or more embodiments, if the result of the fifth determination is YES, the method proceeds to Step 334. If the result of the determination is NO, the method alternatively proceeds to Step 336.

In Step 334, as a result of the fifth determination in Step 332 being YES, the analyzer notifies the corresponding administrator to initiate configuring of extra storage space before extending a current AL retention period of the related application. To this end, the analyzer may send a recommendation (e.g., "please configure extra storage space for App. P for a better user experience") to the administrator as pre-loaded instructions and/or via other methods.

Similar to Step 320 of FIG. 3.2, based on monitoring, if the administrator did not take an action, the analyzer may resend the recommendation to the administrator. In one or more embodiments, the analyzer may then store (temporarily or permanently) the recommendation in the database.

In one or more embodiment, once the extra storage space is configured (by the administrator), the analyzer may send a feedback, via a GUI, to the administrator about the completion of the configuration.

In Step 336, as a result of the fifth determination in Step 332 being NO or after performing Step 334, the analyzer extends the current AL retention period of the related application (e.g., to provide a long(er)-term log data retention) without exceeding a maximum allowed AL retention period (which may be determined by the corresponding administrator).

In Step 338, the analyzer makes a sixth determination as to whether any AL is left to evaluate in terms of UAF. Accordingly, in one or more embodiments, if the result of the sixth determination is YES, the method returns to Step 326 of FIG. 3.2. If the result of the determination is NO, the analyzer may initiate notification of the administrator about the current AL retention period of each application in the AC. The notification may be displayed on the GUI of, for example, the corresponding IN. In one or more embodiments, the method may then end.

To further clarify embodiments of the invention, a non-limiting example use case is provided in FIGS. 4.1 and 4.2.

START OF EXAMPLE

The example use case, illustrated in FIGS. 4.1 and 4.2, is not intended to limit the scope of the embodiments disclosed herein and is independent from any other examples discussed in this application.

Turning to the example, FIGS. 4.1 and 4.2 show a diagram of components of a system (not shown) similar to that of FIG. 1. For the sake of brevity, not all components of the system may be illustrated in FIGS. 4.1 and 4.2.

Turning to the embodiment shown in FIG. 4.1, consider a scenario in which IN A (412) is deployed to Environment A (410), IN F (432) is deployed to Environment C (430), and IN D (442) is deployed to Environment D (440). Initially, FIG. 4.1 shows a diagram in which each application communicates to each other in order to serve a request received from a user (via a client (not shown)).

Assume here that: (i) IN A (412) includes Application A (App. A), (ii) IN F (432) includes App. B, and (iii) IN D (442) includes App. C, in which (a) App. A has the following characteristics: Class I, UAF when an error is seen: 7 days, UAF when no error is seen: 30 days, RASS for an AL of App. A: 5 GB (290 GB/295 GB), and current AL retention period: 90 days; (b) App. B has the following characteristics: Class II, UAF when an error is seen: 10 days, UAF when no error is seen: 45 days, RASS for an AL of App. B: 150 GB (50 GB/200 GB), and current AL retention period: 120 days; and App. C has the following characteristics: Class III, UAF when an error is seen: 10 days, UAF when no error is seen: 45 days, RASS for an AL of App. C: 100 GB (100 GB/200 GB), and current AL retention period: 120 days.

Further, assume here that: (i) App. A receives the request from the client through a network (not shown), (ii) App. A communicates with App. B and sends the request to App. B through the network (shown with the first arrow), (iii) App. B communicates with App. C and sends the request to App. C through the network (shown with the second arrow), (iv) App. C communicates back to App. B and provides a response (to the request) to App. B through the network (shown with the third arrow), (v) App. B communicates back to App. A and provides the response to App. A through the network (shown with the fourth arrow), and (vi) App. A communicates back to the client and provides the response to the client through the network.

Further, assume here that an analyzer (not shown) obtains distributed logs for each application from a database (not shown). Upon obtaining the logs, the analyzer executes distributed tracing to infer dependencies and connectivity among the applications (said another way, by executing a distributed tracing, the analyzer analyzes the logs in order to extract data that is relevant to at least dependencies and connectivity among the applications). Based on the relevant data, the analyzer infers dependencies and connectivity among the applications. Thereafter, based on the inferred dependencies and inferred connectivity among the applications, the analyzer generates an AC.

The analyzer then analyzes the logs and AC to extract, at least, one or more health parameters such as, for example, an error count per request type, an error occurrence duration, and a priority level of each application included in the AC. By employing a multiple linear regression model and based on the health parameters and dependencies among the applications, the analyzer derives a failure score of the AC. Based on the logs, the analyzer then infers an UAF of each AL and RASS for each AL.

Further, the analyzer analyzes the failure score of the AC, UAF of each AL, and RASS for each AL. Based on this analysis, the analyzer makes a first determination that the failure score of the AC is greater than a predetermined failure score (because a hardware component failure is reported for IN A (412), which negatively affects the performance of App. A (more specifically, App. A started to generate more errors for REST requests). Based on the result of the first determination, the analyzer makes a second determination that the AC includes a high priority application (App. A).

Turning to the embodiment shown in FIG. 4.2, FIG. 4.2 shows a diagram of components of the system at a later point in time. Assume here that, based on the second determination performed in FIG. 4.1, the analyzer makes a third determination that App. A's RASS is less than a predetermined storage space limit (25 GB). Based on the result of the third determination, the analyzer notifies an administrator to initiate configuring of extra storage space for App. A's AL before extending the current AL retention period of App. A. Once the extra storage space is configured (where the RASS for the AL of App. A is increased to 210 GB (underlined)), the analyzer extends the current AL retention period of App. A to 120 days (underlined) to provide long-term log data retention for App. A.

Further, because of their dependencies to App. A, the analyzer keeps the current AL retention period of App. B and App. C as-is. Thereafter, the analyzer may initiate notification of the administrator about the current AL retention period of App. A-C.

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing log retention period of an application, the method comprising:
    inferring dependencies among applications executing on a distributed system, wherein the applications are operatively connected through a network;
    inferring connectivity among the applications executing on the distributed system;
    generating an application chain (AC) based on the inferred dependencies and the inferred connectivity;
    analyzing distributed logs and the AC to extract health parameters comprising an error count per request type, an error occurrence duration of an error, and a priority level of each application;
    deriving a failure score of the AC based on the health parameters and the inferred dependencies among the applications;
    inferring at least a user access frequency (UAF) of each application log (AL) and remaining assigned storage space (RASS) for each AL based on the distributed logs;
    analyzing the failure score of the AC, the UAF of each AL, and the RASS for each AL;
    making, based on the analyzing of the failure score of the AC, the UAF of each AL, and the RASS for each AL, a first determination that the failure score of the AC is greater than a predetermined failure score;
    making, based on the first determination, a second determination that the AC comprises a high priority application (HPA);
    making, based on the second determination, a third determination that the RASS for the HPA's AL is less than a predetermined storage space limit;
    notifying, based on the third determination, an administrator to initiate obtaining of extra storage space prior to extending a current AL retention period of the HPA's AL; and
    extending, upon obtaining the extra storage space, the current AL retention period of the HPA's AL to a second AL retention period.

2. The method of claim 1, further comprising:
    obtaining a distributed log for each application executing on the distributed system, wherein the distributed log is one of the distributed logs; and
    executing distributed tracing on the distributed logs to extract relevant data from the distributed logs, wherein the relevant data is used to infer the dependencies and the connectivity among the applications.

3. The method of claim 2, wherein the relevant data specifies at least a trace identifier and a span identifier,
    wherein the trace identifier is a first identifier assigned to a request, wherein the first identifier remains unchanged as the request travels through the HPA to a second application by generating a journey; and
    wherein the span identifier specifies a single step on the journey and is encoded with data related to the second application that is performing an operation on the request.

4. The method of claim 1, further comprising:
    keeping, after extending the current AL retention period of the HPA's AL, a current AL retention period of a second application, wherein the AC comprises at least the HPA and the second application.

5. The method of claim 1, further comprising:
prior to deriving the failure score of the AC:
obtaining a weight for each of the health parameters, wherein the weight for each of the health parameters is configured by the administrator; and
generating, based on at least the health parameters and the weights, a model to derive the failure score of the AC,
wherein the failure score is derived using the model.

6. The method of claim 5, wherein the model is a multiple linear regression model.

7. The method of claim 1, wherein the failure score of the AC is greater than the predetermined failure score when there is a non-reliable network connection between the HPA and an application.

8. A method for managing log retention period of an application, the method comprising:
inferring dependencies among applications executing on a distributed system, wherein the applications are operatively connected through a network;
inferring connectivity among the applications executing on the distributed system;
generating an application chain (AC) based on the inferred dependencies and the inferred connectivity;
analyzing distributed logs and the AC to extract health parameters comprising an error count per request type, an error occurrence duration of an error, and a priority level of each application;
deriving a failure score of the AC based on the health parameters and the inferred dependencies among the applications;
inferring at least a user access frequency (UAF) of each application log (AL) and remaining assigned storage space (RASS) for each AL based on the distributed logs;
analyzing the failure score of the AC, the UAF of each AL, and the RASS for each AL;
making, based on the analyzing of the failure score of the AC, the UAF of each AL, and the RASS for each AL, a first determination that the failure score of the AC is greater than a predetermined failure score;
making, based on the first determination, a second determination that the AC does not comprise a high priority application (HPA);
making, based on the second determination, a third determination that the UAF of an application's AL is greater than a predetermined access threshold value;
making, based on the third determination, a fourth determination that the RASS for the application's AL is less than a predetermined storage space amount;
notifying, based on the fourth determination, an administrator to initiate configuring of extra storage space prior to extending a current AL retention period of the application; and
extending, upon obtaining the extra storage space, the current AL retention period of the application's AL to a second AL retention period.

9. The method of claim 8, further comprising:
obtaining a distributed log for each application executing on the distributed system, wherein the distributed log is one of the distributed logs; and
executing distributed tracing on the distributed logs to extract relevant data from the distributed logs, wherein the relevant data is used to infer the dependencies and the connectivity among the applications.

10. The method of claim 9, wherein the relevant data specifies at least a trace identifier and a span identifier.

11. The method of claim 10, wherein the trace identifier is a first identifier assigned to a request, wherein the first identifier remains unchanged as the request travels through the application to a second application by generating a journey.

12. The method of claim 11, wherein the span identifier specifies a single step on the journey and is encoded with data related to the application that is performing an operation on the request.

13. The method of claim 8, further comprising:
prior to deriving the failure score of the AC:
obtaining a weight for each of the health parameters, wherein the weight for each of the health parameters is configured by the administrator; and
generating, based on at least the health parameters and the weights, a model to derive the failure score of the AC,
wherein the failure score is derived using the model.

14. The method of claim 13, wherein the model is a multiple linear regression model.

15. A method for managing log retention period of an application, the method comprising:
inferring dependencies among applications executing on a distributed system, wherein the applications are operatively connected through a network;
inferring connectivity among the applications executing on the distributed system;
generating an application chain (AC) based on the inferred dependencies and the inferred connectivity;
analyzing distributed logs and the AC to extract health parameters comprising an error count per request type, an error occurrence duration of an error, and a priority level of each application;
deriving a failure score of the AC based on the health parameters and the inferred dependencies among the applications;
inferring at least a user access frequency (UAF) of each application log (AL) and remaining assigned storage space (RASS) for each AL based on the distributed logs;
analyzing the failure score of the AC, the UAF of each AL, and the RASS for each AL;
making, based on the analyzing of the failure score of the AC, the UAF of each AL, and the RASS for each AL, a first determination that the failure score of the AC is greater than a predetermined failure score;
making, based on the first determination, a second determination that the AC does not comprise a high priority application (HPA);
making, based on the second determination, a third determination that the UAF of an application's AL is less than a predetermined access threshold value; and
keeping, based on the third determination, a current AL retention period of the application's AL without changing the current AL retention period.

16. The method of claim 15, further comprising:
obtaining a distributed log for each application executing on the distributed system, wherein the distributed log is one of the distributed logs; and
executing distributed tracing on the distributed logs to extract relevant data from the distributed logs, wherein the relevant data is used to infer the dependencies and the connectivity among the applications.

17. The method of claim 16, wherein the relevant data specifies at least a trace identifier and a span identifier.

18. The method of claim 17, wherein the trace identifier is a first identifier assigned to a request, wherein the first identifier remains unchanged as the request travels through the application to a second application by generating a journey.

19. The method of claim 18, wherein the span identifier specifies a single step on the journey and is encoded with data related to the application that is performing an operation on the request.

20. The method of claim 15, further comprising:
prior to deriving the failure score of the AC:
obtaining a weight for each of the health parameters, wherein the weight for each of the health parameters is configured by an administrator, and
generating, based on at least the health parameters and the weights, a model to derive the failure score of the AC,
wherein the failure score is derived using the model.

* * * * *